US009615221B1

(12) United States Patent
Onyon et al.

(10) Patent No.: US 9,615,221 B1
(45) Date of Patent: Apr. 4, 2017

(54) DEVICE MESSAGE MANAGEMENT SYSTEM

(71) Applicant: Synchronoss Technologies, Inc., Bridgewater, NJ (US)

(72) Inventors: Richard Onyon, San Jose, CA (US); Liam Stannard, San Jose, CA (US); Leighton Ridgard, San Jose, CA (US)

(73) Assignee: Synchronoss Technologies, Inc., Bridgewater, NJ (US)

(*) Notice: Subject to any disclaimer, the term of this patent is extended or adjusted under 35 U.S.C. 154(b) by 506 days.

(21) Appl. No.: 14/044,829

(22) Filed: Oct. 2, 2013

Related U.S. Application Data

(62) Division of application No. 10/895,617, filed on Jul. 21, 2004, now Pat. No. 8,645,471.

(60) Provisional application No. 60/489,163, filed on Jul. 21, 2003, provisional application No. 60/565,199, filed on Apr. 23, 2004.

(51) Int. Cl.
*G06F 15/16* (2006.01)
*H04W 4/12* (2009.01)

(52) U.S. Cl.
CPC .................... *H04W 4/12* (2013.01)

(58) Field of Classification Search
CPC ....... G06Q 10/107; G06Q 10/10; H04W 8/18; H04W 88/184; H04L 51/14; H04L 12/5855; H04L 51/12; H04L 12/585; H04L 51/26
USPC .................................. 709/206, 207
See application file for complete search history.

(56) References Cited

U.S. PATENT DOCUMENTS

| | | |
|---|---|---|
| 4,887,212 A | 12/1989 | Zamora et al. |
| 5,111,398 A | 5/1992 | Nunberg et al. |
| 5,115,466 A | 5/1992 | Presttun |
| 5,130,993 A | 7/1992 | Gutman et al. |
| 5,146,221 A | 9/1992 | Whiting et al. |
| 5,204,902 A | 4/1993 | Reeds et al. |
| 5,329,619 A | 7/1994 | Page et al. |

(Continued)

FOREIGN PATENT DOCUMENTS

| | | |
|---|---|---|
| CN | 1202662 | 12/1998 |
| CN | 1455522 | 11/2003 |

(Continued)

OTHER PUBLICATIONS

How-To Geek, Convert a Row to a Column in Excel the Easy Way, retrieved on Feb. 8, 2015, retrieved from the Internet at URL: <http://www.howtogeek.com/howto/12366/convert-a-row-to-a-column-in-excel-the-easy-way/>.

(Continued)

*Primary Examiner* — David Lazaro
(74) *Attorney, Agent, or Firm* — Synchronoss Technologies, Inc.; Frederick W. Dour

(57) ABSTRACT

A method and system for managing email or other messaging and attachments to messages which are forwarded to devices having limited processing and memory capacity. The method includes the steps of: receiving a user configuration categorizing messages for the user by elements of the message; accessing the user message datastore upon receipt of at least one new message for the user to a user data store; comparing said at least one new message to a set of user specific rules; rendering a message summary including at least one link accessible by the processing device, the link enabling action with respect to the message when selected by the user; and outputting the message summary to a user device.

18 Claims, 19 Drawing Sheets

(56) References Cited

U.S. PATENT DOCUMENTS

| | | |
|---|---|---|
| 5,392,390 A | 2/1995 | Crozier |
| 5,418,854 A | 5/1995 | Kaufman et al. |
| 5,418,908 A | 5/1995 | Keller et al. |
| 5,425,079 A | 6/1995 | Noda et al. |
| 5,483,352 A | 1/1996 | Fukuyama |
| 5,485,161 A | 1/1996 | Vaughn |
| 5,509,070 A | 4/1996 | Schull |
| 5,519,433 A | 5/1996 | Lappington et al. |
| 5,519,606 A | 5/1996 | Frid-Nielsen et al. |
| 5,543,789 A | 8/1996 | Behr et al. |
| 5,544,061 A | 8/1996 | Morimoto et al. |
| 5,561,446 A | 10/1996 | Montlick |
| 5,574,906 A | 11/1996 | Morris |
| 5,579,489 A | 11/1996 | Dornier et al. |
| 5,588,009 A | 12/1996 | Will |
| 5,592,470 A | 1/1997 | Rudrapatna et al. |
| 5,623,406 A | 4/1997 | Ichbiah |
| 5,623,661 A | 4/1997 | Hon |
| 5,628,005 A | 5/1997 | Hurvig |
| 5,630,081 A | 5/1997 | Rybicki et al. |
| 5,638,508 A | 6/1997 | Kanai et al. |
| 5,640,577 A | 6/1997 | Scharmer |
| 5,644,709 A | 7/1997 | Austin |
| 5,647,002 A | 7/1997 | Brunson |
| 5,649,195 A | 7/1997 | Scott et al. |
| 5,650,800 A | 7/1997 | Benson |
| 5,657,372 A | 8/1997 | Ahlberg |
| 5,666,397 A | 9/1997 | Lamons et al. |
| 5,666,553 A | 9/1997 | Crozier |
| 5,682,524 A | 10/1997 | Freund et al. |
| 5,684,990 A | 11/1997 | Boothby |
| 5,694,596 A | 12/1997 | Campbell |
| 5,699,255 A | 12/1997 | Ellis et al. |
| 5,701,423 A | 12/1997 | Crozier |
| 5,706,509 A | 1/1998 | Man-Hak Tso |
| 5,710,922 A | 1/1998 | Alley et al. |
| 5,727,202 A | 3/1998 | Kucala |
| 5,727,950 A | 3/1998 | Cook et al. |
| 5,729,735 A | 3/1998 | Meyering |
| 5,729,739 A | 3/1998 | Cantin et al. |
| 5,729,743 A | 3/1998 | Squibb |
| 5,742,792 A | 4/1998 | Yanai et al. |
| 5,745,750 A | 4/1998 | Porcaro |
| 5,745,906 A | 4/1998 | Squibb |
| 5,757,920 A | 5/1998 | Misra et al. |
| 5,758,150 A | 5/1998 | Bell et al. |
| 5,758,354 A | 5/1998 | Huang et al. |
| 5,758,355 A | 5/1998 | Buchanan |
| 5,764,899 A | 6/1998 | Eggleston et al. |
| 5,768,480 A | 6/1998 | Crawford, Jr. et al. |
| 5,768,597 A | 6/1998 | Simm |
| 5,771,354 A | 6/1998 | Crawford |
| 5,778,346 A | 7/1998 | Frid-Nielsen et al. |
| 5,778,361 A | 7/1998 | Nanjo et al. |
| 5,778,367 A | 7/1998 | Wesinger et al. |
| 5,778,388 A | 7/1998 | Kawamura et al. |
| 5,781,901 A | 7/1998 | Kuzma |
| 5,787,247 A | 7/1998 | Norin et al. |
| 5,787,262 A | 7/1998 | Shakib et al. |
| 5,794,228 A | 8/1998 | French et al. |
| 5,801,699 A | 9/1998 | Hocker et al. |
| 5,804,803 A | 9/1998 | Cragun et al. |
| 5,809,497 A | 9/1998 | Freund et al. |
| 5,812,773 A | 9/1998 | Norin |
| 5,812,793 A | 9/1998 | Shakib et al. |
| 5,818,437 A | 10/1998 | Grover et al. |
| 5,826,245 A | 10/1998 | Sandberg-Diment |
| 5,828,376 A | 10/1998 | Solimene et al. |
| 5,832,489 A | 11/1998 | Kucala |
| 5,832,518 A | 11/1998 | Mastors |
| 5,832,519 A | 11/1998 | Bowen et al. |
| 5,832,520 A | 11/1998 | Miller |
| 5,845,283 A | 12/1998 | Williams et al. |
| 5,859,973 A | 1/1999 | Carpenter |
| 5,864,864 A | 1/1999 | Lerner |
| 5,875,296 A | 2/1999 | Shi et al. |
| 5,884,323 A | 3/1999 | Hawkins et al. |
| 5,884,325 A | 3/1999 | Bauer et al. |
| 5,893,119 A | 4/1999 | Squibb |
| 5,896,321 A | 4/1999 | Miller |
| 5,897,640 A | 4/1999 | Veghte et al. |
| 5,897,642 A | 4/1999 | Capossela et al. |
| 5,903,723 A | 5/1999 | Beck et al. |
| 5,907,793 A | 5/1999 | Reams |
| 5,909,568 A | 6/1999 | Nason |
| 5,923,756 A | 7/1999 | Shambroom |
| 5,923,848 A | 7/1999 | Goodhand et al. |
| 5,926,816 A | 7/1999 | Bauer et al. |
| 5,930,350 A | 7/1999 | Johnson |
| 5,933,653 A | 8/1999 | Ofek |
| 5,933,778 A | 8/1999 | Buhrmann et al. |
| 5,933,816 A | 8/1999 | Zeanah et al. |
| 5,935,262 A | 8/1999 | Barrett et al. |
| 5,937,405 A | 8/1999 | Campbell |
| 5,941,944 A | 8/1999 | Messerly |
| 5,943,676 A | 8/1999 | Boothby |
| 5,944,787 A | 8/1999 | Zoken |
| 5,946,615 A | 8/1999 | Holmes et al. |
| 5,948,066 A | 9/1999 | Whalen et al. |
| 5,950,193 A | 9/1999 | Kulkarni |
| 5,951,636 A | 9/1999 | Zerber |
| 5,961,572 A | 10/1999 | Craport et al. |
| 5,961,590 A | 10/1999 | Mendez et al. |
| 5,966,717 A | 10/1999 | Sass |
| 5,968,131 A | 10/1999 | Mendez et al. |
| 5,970,149 A | 10/1999 | Johnson |
| 5,970,490 A | 10/1999 | Morgenstern |
| 5,971,277 A | 10/1999 | Cragun et al. |
| 5,974,238 A | 10/1999 | Chase, Jr. |
| 5,974,563 A | 10/1999 | Beeler, Jr. |
| 5,987,381 A | 11/1999 | Oshizawa |
| 5,987,609 A | 11/1999 | Hasebe |
| 5,995,118 A | 11/1999 | Masuda |
| 6,000,000 A | 12/1999 | Hawkins et al. |
| 6,006,215 A | 12/1999 | Retallick |
| 6,006,274 A | 12/1999 | Hawkins et al. |
| 6,009,462 A | 12/1999 | Birrell et al. |
| 6,012,063 A | 1/2000 | Bodnar |
| 6,012,088 A | 1/2000 | Li et al. |
| 6,014,695 A | 1/2000 | Yamashita et al. |
| 6,016,394 A | 1/2000 | Walker |
| 6,016,478 A | 1/2000 | Zhang et al. |
| 6,023,620 A | 2/2000 | Hansson |
| 6,023,708 A | 2/2000 | Mendez et al. |
| 6,023,723 A | 2/2000 | McCormick et al. |
| 6,026,414 A | 2/2000 | Anglin |
| 6,034,621 A | 3/2000 | Kaufman |
| 6,038,665 A | 3/2000 | Bolt et al. |
| 6,044,381 A | 3/2000 | Boothby et al. |
| 6,049,776 A | 4/2000 | Donnelly et al. |
| 6,052,735 A | 4/2000 | Ulrich et al. |
| 6,058,399 A | 5/2000 | Morag et al. |
| 6,061,063 A | 5/2000 | Wagner et al. |
| 6,061,790 A | 5/2000 | Bodnar |
| 6,061,796 A | 5/2000 | Chen et al. |
| 6,063,134 A | 5/2000 | Peters et al. |
| 6,064,880 A | 5/2000 | Alanara |
| 6,065,018 A | 5/2000 | Beier et al. |
| 6,067,582 A | 5/2000 | Smith et al. |
| 6,073,133 A | 6/2000 | Chrabaszcz |
| 6,076,109 A | 6/2000 | Kikinis |
| 6,078,960 A | 6/2000 | Ballard |
| 6,081,900 A | 6/2000 | Subramaniam et al. |
| 6,094,618 A | 7/2000 | Harada |
| 6,101,480 A | 8/2000 | Conmy et al. |
| 6,108,330 A | 8/2000 | Bhatia et al. |
| 6,108,703 A | 8/2000 | Leighton et al. |
| 6,112,024 A | 8/2000 | Almond et al. |
| 6,115,797 A | 9/2000 | Kanda et al. |
| 6,131,096 A | 10/2000 | Ng et al. |
| 6,131,116 A | 10/2000 | Riggins et al. |
| 6,141,011 A | 10/2000 | Bodnar et al. |
| 6,141,621 A | 10/2000 | Piwowarski et al. |
| 6,141,659 A | 10/2000 | Barker et al. |

(56) References Cited

U.S. PATENT DOCUMENTS

| | | |
|---|---|---|
| 6,141,664 A | 10/2000 | Boothby |
| 6,145,088 A | 11/2000 | Stevens |
| 6,148,260 A | 11/2000 | Musk et al. |
| 6,151,606 A | 11/2000 | Mendez |
| 6,157,630 A | 12/2000 | Adler et al. |
| 6,163,773 A | 12/2000 | Kishi |
| 6,163,779 A | 12/2000 | Mantha et al. |
| 6,163,844 A | 12/2000 | Duncan et al. |
| 6,167,120 A | 12/2000 | Kikinis |
| 6,173,310 B1 | 1/2001 | Yost et al. |
| 6,173,311 B1 | 1/2001 | Hassett et al. |
| 6,182,117 B1 | 1/2001 | Christie et al. |
| 6,182,141 B1 | 1/2001 | Blum et al. |
| 6,185,598 B1 | 2/2001 | Farber et al. |
| 6,189,030 B1 | 2/2001 | Kirsch et al. |
| 6,189,096 B1 | 2/2001 | Haverty |
| 6,195,695 B1 | 2/2001 | Cheston et al. |
| 6,195,794 B1 | 2/2001 | Buxton |
| 6,202,085 B1 | 3/2001 | Benson et al. |
| 6,205,448 B1 | 3/2001 | Kruglikov et al. |
| 6,209,034 B1 | 3/2001 | Gladwin et al. |
| 6,212,529 B1 | 4/2001 | Boothby et al. |
| 6,212,556 B1 | 4/2001 | Arunachalam |
| 6,216,131 B1 | 4/2001 | Liu et al. |
| 6,219,680 B1 | 4/2001 | Bernardo et al. |
| 6,219,694 B1 | 4/2001 | Lazaridis et al. |
| 6,223,187 B1 | 4/2001 | Boothby et al. |
| 6,226,650 B1 | 5/2001 | Mahajan et al. |
| 6,233,565 B1 | 5/2001 | Lewis et al. |
| 6,233,589 B1 | 5/2001 | Balcha et al. |
| 6,243,705 B1 | 6/2001 | Kucala |
| 6,243,760 B1 | 6/2001 | Armbruster et al. |
| 6,246,889 B1 | 6/2001 | Boltz |
| 6,247,048 B1 | 6/2001 | Greer et al. |
| 6,247,135 B1 | 6/2001 | Feague |
| 6,249,690 B1 | 6/2001 | Mashiko |
| 6,252,547 B1 | 6/2001 | Perry et al. |
| 6,255,989 B1 | 7/2001 | Munson et al. |
| 6,256,750 B1 | 7/2001 | Takeda |
| 6,260,124 B1 | 7/2001 | Crockett et al. |
| 6,269,405 B1 | 7/2001 | Dutcher et al. |
| 6,272,545 B1 | 8/2001 | Flanagin et al. |
| 6,275,831 B1 | 8/2001 | Bodnar et al. |
| 6,278,941 B1 | 8/2001 | Yokoyama |
| 6,282,435 B1 | 8/2001 | Wagner et al. |
| 6,282,698 B1 | 8/2001 | Baker et al. |
| 6,285,889 B1 | 9/2001 | Nykanen et al. |
| 6,286,029 B1 | 9/2001 | Delph |
| 6,286,053 B1 | 9/2001 | Van Peursem et al. |
| 6,286,085 B1 | 9/2001 | Jouenne et al. |
| 6,289,212 B1 | 9/2001 | Stein et al. |
| 6,292,743 B1 | 9/2001 | Pu et al. |
| 6,292,905 B1 | 9/2001 | Wallach et al. |
| 6,295,502 B1 | 9/2001 | Hancock et al. |
| 6,295,541 B1 | 9/2001 | Bodnar et al. |
| 6,304,881 B1 | 10/2001 | Halim et al. |
| 6,317,755 B1 | 11/2001 | Rakers et al. |
| 6,321,236 B1 | 11/2001 | Zollinger et al. |
| 6,324,467 B1 | 11/2001 | Machii et al. |
| 6,324,526 B1 | 11/2001 | D'Agostino |
| 6,324,544 B1 | 11/2001 | Alam et al. |
| 6,327,533 B1 | 12/2001 | Chou |
| 6,329,680 B1 | 12/2001 | Yoshida et al. |
| 6,330,568 B1 | 12/2001 | Boothby et al. |
| 6,332,158 B1 | 12/2001 | Risley et al. |
| 6,333,973 B1 | 12/2001 | Smith et al. |
| 6,338,096 B1 | 1/2002 | Ukelson |
| 6,339,710 B1 | 1/2002 | Suzuki |
| 6,341,316 B1 | 1/2002 | Kloba et al. |
| 6,345,308 B1 | 2/2002 | Abe |
| 6,349,336 B1 | 2/2002 | Sit et al. |
| 6,351,764 B1 * | 2/2002 | Voticky ............... G06Q 10/107 709/206 |
| 6,353,448 B1 | 3/2002 | Scarborough et al. |
| 6,356,910 B1 | 3/2002 | Zellweger |
| 6,356,961 B1 | 3/2002 | Oprescu-Surcobe |
| 6,360,252 B1 | 3/2002 | Rudy et al. |
| 6,360,330 B1 | 3/2002 | Mutalik et al. |
| 6,363,249 B1 | 3/2002 | Nordeman et al. |
| 6,363,412 B1 | 3/2002 | Niwa et al. |
| 6,374,250 B2 | 4/2002 | Ajtai et al. |
| 6,381,700 B1 | 4/2002 | Yoshida |
| 6,389,462 B1 | 5/2002 | Cohen et al. |
| 6,396,482 B1 | 5/2002 | Griffin et al. |
| 6,397,307 B2 | 5/2002 | Ohran |
| 6,397,351 B1 | 5/2002 | Miller et al. |
| 6,401,104 B1 | 6/2002 | LaRue et al. |
| 6,405,218 B1 | 6/2002 | Boothby |
| 6,418,309 B1 | 7/2002 | Moon et al. |
| 6,430,289 B1 | 8/2002 | Liffick |
| 6,430,576 B1 | 8/2002 | Gates et al. |
| 6,434,621 B1 | 8/2002 | Pezzillo et al. |
| 6,434,627 B1 | 8/2002 | Millet et al. |
| 6,437,818 B1 | 8/2002 | Ludwig et al. |
| 6,449,622 B1 | 9/2002 | LaRue et al. |
| 6,453,392 B1 | 9/2002 | Flynn, Jr. |
| 6,457,062 B1 | 9/2002 | Pivowar et al. |
| 6,460,036 B1 | 10/2002 | Herz |
| 6,462,644 B1 | 10/2002 | Howell et al. |
| 6,463,464 B1 | 10/2002 | Lazaridis et al. |
| 6,466,967 B2 | 10/2002 | Landsman et al. |
| 6,473,621 B1 | 10/2002 | Heie |
| 6,480,896 B1 | 11/2002 | Brown et al. |
| 6,484,143 B1 | 11/2002 | Swildens et al. |
| 6,487,560 B1 | 11/2002 | LaRue et al. |
| 6,490,655 B1 | 12/2002 | Kershaw |
| 6,496,944 B1 | 12/2002 | Hsiao et al. |
| 6,499,108 B1 | 12/2002 | Johnson |
| 6,505,216 B1 | 1/2003 | Schutzman et al. |
| 6,507,891 B1 | 1/2003 | Challenger et al. |
| 6,516,314 B1 | 2/2003 | Birkler et al. |
| 6,516,327 B1 | 2/2003 | Zondervan et al. |
| 6,519,452 B1 | 2/2003 | Agostino et al. |
| 6,523,063 B1 | 2/2003 | Hanson |
| 6,523,079 B2 | 2/2003 | Kikinis et al. |
| 6,532,588 B1 | 3/2003 | Porter |
| 6,535,743 B1 | 3/2003 | Kennedy et al. |
| 6,535,949 B1 | 3/2003 | Parker |
| 6,539,494 B1 | 3/2003 | Abramson et al. |
| 6,542,933 B1 | 4/2003 | Durst, Jr. et al. |
| 6,546,425 B1 | 4/2003 | Hanson et al. |
| 6,549,933 B1 | 4/2003 | Barrett et al. |
| 6,549,937 B1 | 4/2003 | Auerbach et al. |
| 6,553,375 B1 | 4/2003 | Huang et al. |
| 6,553,410 B2 | 4/2003 | Kikinis |
| 6,553,413 B1 | 4/2003 | Leighton et al. |
| 6,564,336 B1 | 5/2003 | Majkowski |
| 6,567,850 B1 | 5/2003 | Freishtat et al. |
| 6,567,857 B1 | 5/2003 | Gupta et al. |
| 6,574,744 B1 | 6/2003 | Kantz et al. |
| 6,581,065 B1 | 6/2003 | Rodkin et al. |
| 6,584,454 B1 | 6/2003 | Hummel et al. |
| 6,589,290 B1 | 7/2003 | Maxwell et al. |
| 6,591,266 B1 | 7/2003 | Li et al. |
| 6,591,306 B1 | 7/2003 | Redlich |
| 6,591,362 B1 | 7/2003 | Li |
| 6,597,700 B2 | 7/2003 | Golikeri et al. |
| 6,601,071 B1 | 7/2003 | Bowker et al. |
| 6,601,143 B1 | 7/2003 | Lamparter |
| 6,609,005 B1 | 8/2003 | Chern |
| 6,611,850 B1 | 8/2003 | Shen |
| 6,628,194 B1 | 9/2003 | Hellebust et al. |
| 6,636,894 B1 | 10/2003 | Short et al. |
| 6,643,707 B1 | 11/2003 | Booth |
| 6,647,399 B2 | 11/2003 | Zaremba |
| 6,654,746 B1 | 11/2003 | Wong et al. |
| 6,662,212 B1 | 12/2003 | Chandhok et al. |
| 6,665,721 B1 | 12/2003 | Hind et al. |
| 6,668,254 B2 | 12/2003 | Matson et al. |
| 6,671,724 B1 | 12/2003 | Pandya et al. |
| 6,671,757 B1 | 12/2003 | Multer et al. |
| 6,684,088 B1 | 1/2004 | Halahmi |
| 6,684,206 B2 | 1/2004 | Chen et al. |
| 6,684,302 B2 | 1/2004 | Kershaw |

(56) References Cited

U.S. PATENT DOCUMENTS

| | | |
|---|---|---|
| 6,694,335 B1 | 2/2004 | Hopmann et al. |
| 6,694,336 B1 | 2/2004 | Multer et al. |
| 6,701,316 B1 | 3/2004 | Li et al. |
| 6,704,849 B2 | 3/2004 | Steegmans |
| 6,714,987 B1 | 3/2004 | Amin et al. |
| 6,718,336 B1 | 4/2004 | Saffer et al. |
| 6,718,348 B1 | 4/2004 | Novak et al. |
| 6,718,390 B1 | 4/2004 | Still et al. |
| 6,725,239 B2 | 4/2004 | Sherman et al. |
| 6,728,530 B1 | 4/2004 | Heinonen et al. |
| 6,732,101 B1 | 5/2004 | Cook |
| 6,732,264 B1 | 5/2004 | Sun et al. |
| 6,734,883 B1 | 5/2004 | Wynn et al. |
| 6,738,789 B2 | 5/2004 | Multer et al. |
| 6,741,851 B1 | 5/2004 | Lee et al. |
| 6,745,040 B2 | 6/2004 | Zimmerman |
| 6,757,696 B2 | 6/2004 | Multer et al. |
| 6,757,698 B2 | 6/2004 | McBride et al. |
| 6,757,712 B1 | 6/2004 | Bastian et al. |
| 6,781,575 B1 | 8/2004 | Hawkins et al. |
| 6,795,848 B1 | 9/2004 | Border et al. |
| 6,799,214 B1 | 9/2004 | Li |
| 6,804,690 B1 | 10/2004 | Dysert et al. |
| 6,804,783 B1 | 10/2004 | Wesinger, Jr. et al. |
| 6,810,411 B1 | 10/2004 | Coughlin et al. |
| 6,812,961 B1 | 11/2004 | Parulski et al. |
| 6,813,487 B1 | 11/2004 | Trommelen |
| 6,816,481 B1 | 11/2004 | Adams et al. |
| 6,829,654 B1 | 12/2004 | Jungck |
| 6,836,657 B2 | 12/2004 | Ji et al. |
| 6,836,765 B1 | 12/2004 | Sussman |
| 6,839,022 B1 | 1/2005 | Benco et al. |
| 6,839,568 B2 | 1/2005 | Suzuki |
| 6,842,695 B1 | 1/2005 | Tu |
| 6,850,944 B1 | 2/2005 | MacCall et al. |
| 6,868,451 B1 | 3/2005 | Peacock |
| 6,870,921 B1 | 3/2005 | Elsey et al. |
| 6,886,013 B1 | 4/2005 | Beranek |
| 6,892,225 B1 | 5/2005 | Tu et al. |
| 6,892,245 B1 | 5/2005 | Crump et al. |
| 6,904,449 B1 | 6/2005 | Quinones |
| 6,904,460 B1 | 6/2005 | Raciborski et al. |
| 6,920,488 B1 | 7/2005 | Le Pennec et al. |
| 6,925,476 B1 | 8/2005 | Multer |
| 6,925,477 B1 | 8/2005 | Champagne et al. |
| 6,934,767 B1 | 8/2005 | Jellinek |
| 6,944,651 B2 | 9/2005 | Onyon et al. |
| 6,944,676 B1 | 9/2005 | Armbruster et al. |
| 6,954,660 B2 | 10/2005 | Aoyama |
| 6,954,783 B1 | 10/2005 | Bodwell et al. |
| 6,959,331 B1 | 10/2005 | Traversat et al. |
| 6,963,914 B1 | 11/2005 | Breitbart et al. |
| 6,973,299 B2 | 12/2005 | Apfel |
| 6,975,709 B1 | 12/2005 | Wullert, II |
| 6,990,187 B2 | 1/2006 | MacNamara et al. |
| 6,996,617 B1 | 2/2006 | Aiken, Jr. et al. |
| 6,996,631 B1 | 2/2006 | Aiken, Jr. et al. |
| 7,003,555 B1 | 2/2006 | Jungck |
| 7,003,668 B2 | 2/2006 | Berson et al. |
| 7,007,041 B2 | 2/2006 | Multer et al. |
| 7,007,067 B1* | 2/2006 | Azvine ............... G06F 3/011 709/202 |
| 7,010,578 B1 | 3/2006 | Lewin et al. |
| 7,016,964 B1 | 3/2006 | Still et al. |
| 7,023,868 B2 | 4/2006 | Rabenko et al. |
| 7,024,491 B1 | 4/2006 | Hanmann et al. |
| 7,030,730 B1 | 4/2006 | Zondervan |
| 7,035,878 B1 | 4/2006 | Multer et al. |
| 7,039,656 B1 | 5/2006 | Tsai et al. |
| 7,051,275 B2 | 5/2006 | Gupta et al. |
| 7,054,594 B2 | 5/2006 | Bloch et al. |
| 7,054,952 B1 | 5/2006 | Schwerdtfeger et al. |
| 7,082,476 B1 | 7/2006 | Cohen et al. |
| 7,085,817 B1 | 8/2006 | Tock et al. |
| 7,096,418 B1 | 8/2006 | Singhal et al. |
| 7,099,915 B1 | 8/2006 | Tenereillo et al. |
| 7,103,794 B2 | 9/2006 | Malcolm et al. |
| 7,107,043 B2 | 9/2006 | Aoyama |
| 7,110,954 B2 | 9/2006 | Yung et al. |
| 7,116,681 B1 | 10/2006 | Hovell et al. |
| 7,133,503 B2 | 11/2006 | Revisky |
| 7,146,161 B2 | 12/2006 | Chou |
| 7,158,805 B1 | 1/2007 | Park et al. |
| 7,159,036 B2 | 1/2007 | Hinchliffe et al. |
| 7,162,494 B2 | 1/2007 | Arellano |
| 7,167,728 B1 | 1/2007 | Wagner et al. |
| 7,181,628 B2 | 2/2007 | Sato et al. |
| 7,197,574 B1 | 3/2007 | Ishiyama |
| 7,233,791 B2 | 6/2007 | Gilbert et al. |
| 7,237,027 B1 | 6/2007 | Raccah et al. |
| 7,249,175 B1 | 7/2007 | Donaldson |
| 7,269,433 B2 | 9/2007 | Vargas et al. |
| 7,284,051 B1 | 10/2007 | Okano et al. |
| 7,289,964 B1 | 10/2007 | Bowman-Amuah |
| 7,293,074 B1 | 11/2007 | Jellinek et al. |
| 7,308,651 B2 | 12/2007 | Kling et al. |
| 7,315,826 B1 | 1/2008 | Guheen et al. |
| 7,317,907 B2 | 1/2008 | Linkert et al. |
| 7,328,341 B1 | 2/2008 | Eun et al. |
| 7,343,568 B2 | 3/2008 | Jiang et al. |
| 7,349,719 B2 | 3/2008 | Buniatyan |
| 7,356,559 B1 | 4/2008 | Jacobs et al. |
| 7,363,233 B1 | 4/2008 | Levine |
| 7,383,061 B1 | 6/2008 | Hawkins |
| 7,392,034 B2 | 6/2008 | Westman et al. |
| 7,415,486 B2 | 8/2008 | Multer et al. |
| 7,440,746 B1 | 10/2008 | Swan |
| 7,447,743 B1 | 11/2008 | Jordan, Jr. |
| 7,454,500 B1 | 11/2008 | Hsu et al. |
| 7,499,888 B1 | 3/2009 | Tu et al. |
| 7,505,762 B2 | 3/2009 | Onyon et al. |
| 7,519,166 B1 | 4/2009 | Silver et al. |
| 7,519,702 B1 | 4/2009 | Allan |
| 7,539,697 B1 | 5/2009 | Akella et al. |
| 7,587,398 B1 | 9/2009 | Fredricksen et al. |
| 7,596,609 B1 | 9/2009 | Refuah et al. |
| 7,643,824 B2 | 1/2010 | Onyon |
| 7,663,652 B1 | 2/2010 | Reese |
| 7,707,150 B2 | 4/2010 | Sundararajan et al. |
| 7,764,782 B1 | 7/2010 | Coughlan |
| 7,853,664 B1 | 12/2010 | Wang et al. |
| 7,895,273 B1* | 2/2011 | Haldar ............... G06Q 10/10 370/229 |
| 7,895,334 B1 | 2/2011 | Tu et al. |
| 7,957,772 B2 | 6/2011 | Charlier |
| 8,010,095 B2 | 8/2011 | Natsuno et al. |
| 8,044,818 B2 | 10/2011 | Tysowski et al. |
| 8,073,954 B1 | 12/2011 | Tu et al. |
| 8,156,074 B1 | 4/2012 | Multer et al. |
| 8,224,308 B1 | 7/2012 | Gavrylyako et al. |
| 8,612,590 B1 | 12/2013 | Chaddha et al. |
| 2001/0005849 A1 | 6/2001 | Boothby et al. |
| 2001/0014893 A1 | 8/2001 | Boothby |
| 2001/0028363 A1 | 10/2001 | Nomoto et al. |
| 2001/0034737 A1 | 10/2001 | Cane et al. |
| 2001/0044805 A1 | 11/2001 | Multer et al. |
| 2001/0044838 A1 | 11/2001 | Iida |
| 2001/0047393 A1 | 11/2001 | Arner et al. |
| 2001/0047471 A1 | 11/2001 | Johnson |
| 2001/0051920 A1 | 12/2001 | Joao et al. |
| 2001/0056473 A1 | 12/2001 | Arneson et al. |
| 2002/0007303 A1 | 1/2002 | Brokler et al. |
| 2002/0010868 A1 | 1/2002 | Nakashima et al. |
| 2002/0016818 A1 | 2/2002 | Kirani et al. |
| 2002/0016912 A1 | 2/2002 | Johnson |
| 2002/0023136 A1 | 2/2002 | Silver et al. |
| 2002/0032751 A1 | 3/2002 | Bharadwaj |
| 2002/0035605 A1 | 3/2002 | McDowell et al. |
| 2002/0040369 A1 | 4/2002 | Multer et al. |
| 2002/0049852 A1 | 4/2002 | Lee et al. |
| 2002/0055909 A1 | 5/2002 | Fung et al. |
| 2002/0056011 A1 | 5/2002 | Nardone et al. |
| 2002/0059116 A1 | 5/2002 | Bulatovic et al. |
| 2002/0062365 A1 | 5/2002 | Nishikawa et al. |

(56) References Cited

U.S. PATENT DOCUMENTS

| | | |
|---|---|---|
| 2002/0067816 A1 | 6/2002 | Bushnell |
| 2002/0069178 A1 | 6/2002 | Hoffman |
| 2002/0072350 A1 | 6/2002 | Fukuzato |
| 2002/0073212 A1 | 6/2002 | Sokol et al. |
| 2002/0078075 A1 | 6/2002 | Colson et al. |
| 2002/0082995 A1 | 6/2002 | Christie |
| 2002/0083325 A1 | 6/2002 | Mediratta et al. |
| 2002/0087588 A1 | 7/2002 | McBride et al. |
| 2002/0091785 A1 | 7/2002 | Ohlenbusch et al. |
| 2002/0116444 A1 | 8/2002 | Chaudhri et al. |
| 2002/0118192 A1 | 8/2002 | Couckuyt et al. |
| 2002/0120600 A1 | 8/2002 | Schiavone et al. |
| 2002/0126814 A1 | 9/2002 | Awada et al. |
| 2002/0128908 A1 | 9/2002 | Levin et al. |
| 2002/0129047 A1 | 9/2002 | Cane et al. |
| 2002/0138582 A1 | 9/2002 | Chandra et al. |
| 2002/0138765 A1 | 9/2002 | Fishman et al. |
| 2002/0152278 A1 | 10/2002 | Pontenzone et al. |
| 2002/0162011 A1 | 10/2002 | Tanaka et al. |
| 2002/0168964 A1 | 11/2002 | Kraft |
| 2002/0168975 A1 | 11/2002 | Gresham et al. |
| 2002/0194196 A1 | 12/2002 | Weinberg et al. |
| 2003/0021274 A1 | 1/2003 | Siikaniemi et al. |
| 2003/0028451 A1 | 2/2003 | Ananian |
| 2003/0028554 A1 | 2/2003 | Koskimies et al. |
| 2003/0028603 A1 | 2/2003 | Aktas et al. |
| 2003/0028647 A1 | 2/2003 | Grosu |
| 2003/0037020 A1 | 2/2003 | Novak et al. |
| 2003/0043195 A1 | 3/2003 | Kling et al. |
| 2003/0046433 A1 | 3/2003 | Luzzatti et al. |
| 2003/0061163 A1 | 3/2003 | Durfield |
| 2003/0065934 A1 | 4/2003 | Angelo et al. |
| 2003/0069874 A1 | 4/2003 | Hertzog et al. |
| 2003/0084121 A1 | 5/2003 | De Boor et al. |
| 2003/0093797 A1 | 5/2003 | Bazzaz |
| 2003/0110280 A1 | 6/2003 | Hinchliffe et al. |
| 2003/0115240 A1 | 6/2003 | Cho |
| 2003/0134625 A1 | 7/2003 | Choi |
| 2003/0135463 A1 | 7/2003 | Brown et al. |
| 2003/0139172 A1 | 7/2003 | Lampela et al. |
| 2003/0154171 A1 | 8/2003 | Karp et al. |
| 2003/0158960 A1 | 8/2003 | Engberg |
| 2003/0163483 A1 | 8/2003 | Zingher et al. |
| 2003/0172236 A1 | 9/2003 | Iyengar et al. |
| 2003/0195937 A1 * | 10/2003 | Kircher, Jr. .......... G06Q 10/107 709/207 |
| 2003/0200234 A1 | 10/2003 | Koppich et al. |
| 2003/0204568 A1 | 10/2003 | Bhargava et al. |
| 2003/0208480 A1 | 11/2003 | Faulkner et al. |
| 2003/0208546 A1 | 11/2003 | Desalvo et al. |
| 2003/0217181 A1 | 11/2003 | Kiiskinen |
| 2003/0224760 A1 | 12/2003 | Day |
| 2003/0229723 A1 | 12/2003 | Kangas et al. |
| 2003/0229898 A1 | 12/2003 | Babu et al. |
| 2003/0233383 A1 | 12/2003 | Koskimies |
| 2003/0233418 A1 | 12/2003 | Goldman |
| 2003/0236933 A1 | 12/2003 | Shigeta et al. |
| 2004/0003390 A1 | 1/2004 | Canter et al. |
| 2004/0054746 A1 | 3/2004 | Shibata |
| 2004/0093317 A1 | 5/2004 | Swan |
| 2004/0093342 A1 | 5/2004 | Arbo et al. |
| 2004/0093385 A1 | 5/2004 | Yamagata |
| 2004/0110497 A1 | 6/2004 | Little |
| 2004/0111465 A1 | 6/2004 | Chuang et al. |
| 2004/0119760 A1 | 6/2004 | Grossman et al. |
| 2004/0120477 A1 | 6/2004 | Nguyen et al. |
| 2004/0128324 A1 | 7/2004 | Sheynman et al. |
| 2004/0132428 A1 | 7/2004 | Mulligan |
| 2004/0142711 A1 | 7/2004 | Mahonen et al. |
| 2004/0146150 A1 | 7/2004 | Barnes |
| 2004/0148408 A1 | 7/2004 | Nadarajah |
| 2004/0162830 A1 | 8/2004 | Shirwadkar et al. |
| 2004/0174965 A1 | 9/2004 | Brahm et al. |
| 2004/0192260 A1 | 9/2004 | Sugimoto et al. |
| 2004/0192282 A1 | 9/2004 | Vasudevan |
| 2004/0193953 A1 | 9/2004 | Callahan et al. |
| 2004/0204120 A1 | 10/2004 | Jiles |
| 2004/0224665 A1 | 11/2004 | Kokubo |
| 2004/0235523 A1 | 11/2004 | Schrire et al. |
| 2004/0267390 A1 | 12/2004 | Ben-Yaacov et al. |
| 2004/0267676 A1 | 12/2004 | Feng et al. |
| 2004/0267944 A1 | 12/2004 | Britt |
| 2005/0021571 A1 | 1/2005 | East |
| 2005/0032527 A1 | 2/2005 | Sheha et al. |
| 2005/0038863 A1 | 2/2005 | Onyon et al. |
| 2005/0044404 A1 | 2/2005 | Bhansali et al. |
| 2005/0050117 A1 | 3/2005 | Seo et al. |
| 2005/0054354 A1 | 3/2005 | Roman et al. |
| 2005/0060365 A1 * | 3/2005 | Robinson .............. H04L 69/329 709/203 |
| 2005/0060392 A1 | 3/2005 | Goring et al. |
| 2005/0064859 A1 | 3/2005 | Kotzin et al. |
| 2005/0081152 A1 | 4/2005 | Commarford |
| 2005/0086296 A1 | 4/2005 | Chi et al. |
| 2005/0086318 A1 | 4/2005 | Aubault |
| 2005/0090253 A1 | 4/2005 | Kim et al. |
| 2005/0096975 A1 | 5/2005 | Moshe |
| 2005/0099963 A1 | 5/2005 | Multer et al. |
| 2005/0100150 A1 | 5/2005 | Dhara et al. |
| 2005/0102257 A1 | 5/2005 | Onyon et al. |
| 2005/0102328 A1 | 5/2005 | Ring et al. |
| 2005/0114470 A1 | 5/2005 | Bal |
| 2005/0131990 A1 | 6/2005 | Jewell |
| 2005/0143111 A1 | 6/2005 | Fitzpatrick et al. |
| 2005/0144200 A1 | 6/2005 | Hesselink et al. |
| 2005/0144251 A1 | 6/2005 | Slate |
| 2005/0157858 A1 | 7/2005 | Rajagopalan |
| 2005/0164651 A1 | 7/2005 | Ollis et al. |
| 2005/0177419 A1 | 8/2005 | Choi et al. |
| 2005/0191998 A1 | 9/2005 | Onyon et al. |
| 2005/0203971 A1 | 9/2005 | Koskimies et al. |
| 2005/0203992 A1 | 9/2005 | Tanaka et al. |
| 2005/0204001 A1 | 9/2005 | Stein et al. |
| 2005/0210101 A1 | 9/2005 | Janik |
| 2005/0216300 A1 | 9/2005 | Appelman et al. |
| 2005/0227674 A1 | 10/2005 | Kopra et al. |
| 2005/0233800 A1 | 10/2005 | Jones |
| 2005/0240494 A1 | 10/2005 | Cue et al. |
| 2005/0246325 A1 | 11/2005 | Pettinati |
| 2005/0268107 A1 | 12/2005 | Harris et al. |
| 2005/0273632 A1 | 12/2005 | Kawakami |
| 2005/0283741 A1 | 12/2005 | Balabanovic et al. |
| 2006/0021059 A1 | 1/2006 | Brown et al. |
| 2006/0035647 A1 | 2/2006 | Eisner et al. |
| 2006/0052091 A1 | 3/2006 | Onyon et al. |
| 2006/0056606 A1 | 3/2006 | Bocking et al. |
| 2006/0095397 A1 | 5/2006 | Torres et al. |
| 2006/0129627 A1 | 6/2006 | Phillips et al. |
| 2006/0148418 A1 | 7/2006 | Purkayastha et al. |
| 2006/0148477 A1 | 7/2006 | Reilly |
| 2006/0190626 A1 | 8/2006 | Bhogal et al. |
| 2006/0195474 A1 | 8/2006 | Cadiz et al. |
| 2006/0199599 A1 | 9/2006 | Gupta et al. |
| 2006/0206709 A1 | 9/2006 | Labrou et al. |
| 2006/0212482 A1 | 9/2006 | Celik |
| 2006/0224675 A1 | 10/2006 | Fox et al. |
| 2006/0233335 A1 | 10/2006 | Pfleging et al. |
| 2006/0268842 A1 | 11/2006 | Takahashi et al. |
| 2006/0277160 A1 | 12/2006 | Singh et al. |
| 2006/0288112 A1 | 12/2006 | Soelberg et al. |
| 2007/0005504 A1 | 1/2007 | Chen et al. |
| 2007/0016796 A1 | 1/2007 | Singhal |
| 2007/0022469 A1 | 1/2007 | Cooper et al. |
| 2007/0037605 A1 | 2/2007 | Logan |
| 2007/0043739 A1 | 2/2007 | Takai et al. |
| 2007/0047523 A1 | 3/2007 | Jiang |
| 2007/0047533 A1 | 3/2007 | Criddle et al. |
| 2007/0050734 A1 | 3/2007 | Busey |
| 2007/0053335 A1 | 3/2007 | Onyon et al. |
| 2007/0056043 A1 | 3/2007 | Onyon et al. |
| 2007/0061331 A1 | 3/2007 | Ramer et al. |
| 2007/0082668 A1 | 4/2007 | Silver et al. |
| 2007/0094042 A1 | 4/2007 | Ramer et al. |
| 2007/0127597 A1 | 6/2007 | Ammer et al. |

(56) References Cited

U.S. PATENT DOCUMENTS

| | | |
|---|---|---|
| 2007/0173236 A1 | 7/2007 | Vishwanathan et al. |
| 2007/0190983 A1 | 8/2007 | Goldfarb et al. |
| 2007/0214149 A1 | 9/2007 | Bodin et al. |
| 2007/0214264 A1 | 9/2007 | Koister |
| 2007/0220419 A1 | 9/2007 | Stibel et al. |
| 2007/0226199 A1 | 9/2007 | Moore et al. |
| 2007/0226272 A1 | 9/2007 | Huang et al. |
| 2007/0226783 A1 | 9/2007 | Mimlitsch |
| 2007/0254697 A1 | 11/2007 | Sugio et al. |
| 2008/0005080 A1 | 1/2008 | Xiques et al. |
| 2008/0005282 A1 | 1/2008 | Gaedcke |
| 2008/0009268 A1 | 1/2008 | Ramer et al. |
| 2008/0022220 A1 | 1/2008 | Cheah |
| 2008/0027826 A1 | 1/2008 | Popick et al. |
| 2008/0037743 A1 | 2/2008 | Bishop |
| 2008/0039020 A1 | 2/2008 | Eskin |
| 2008/0051071 A1 | 2/2008 | Vishwanathan et al. |
| 2008/0051117 A1 | 2/2008 | Khare et al. |
| 2008/0059897 A1 | 3/2008 | Dilorenzo |
| 2008/0064378 A1 | 3/2008 | Kahan et al. |
| 2008/0082421 A1 | 4/2008 | Onyon et al. |
| 2008/0089299 A1 | 4/2008 | Lindsley et al. |
| 2008/0104442 A1 | 5/2008 | Diao et al. |
| 2008/0109881 A1 | 5/2008 | Dasdan |
| 2008/0120199 A1 | 5/2008 | Pirnack et al. |
| 2008/0127289 A1 | 5/2008 | Julia et al. |
| 2008/0201362 A1 | 8/2008 | Multer et al. |
| 2008/0208617 A1 | 8/2008 | Onyon et al. |
| 2008/0214163 A1 | 9/2008 | Onyon et al. |
| 2008/0214167 A1 | 9/2008 | Natsuno et al. |
| 2008/0268823 A1 | 10/2008 | Shalev et al. |
| 2008/0270805 A1 | 10/2008 | Kean |
| 2008/0294768 A1 | 11/2008 | Sampson et al. |
| 2009/0012940 A1 | 1/2009 | Ives et al. |
| 2009/0037828 A1 | 2/2009 | Waite et al. |
| 2009/0049135 A1 | 2/2009 | O'Sullivan et al. |
| 2009/0055464 A1 | 2/2009 | Multer et al. |
| 2009/0106110 A1 | 4/2009 | Stannard et al. |
| 2009/0138546 A1 | 5/2009 | Cruzada |
| 2009/0143052 A1 | 6/2009 | Bates et al. |
| 2009/0183091 A1 | 7/2009 | Sharpe et al. |
| 2009/0186672 A1 | 7/2009 | Duff et al. |
| 2009/0254560 A1 | 10/2009 | Klein et al. |
| 2009/0287921 A1 | 11/2009 | Zhu et al. |
| 2009/0307486 A1 | 12/2009 | Grajek et al. |
| 2009/0327305 A1 | 12/2009 | Roberts et al. |
| 2010/0057777 A1 | 3/2010 | Williamson |
| 2010/0095238 A1 | 4/2010 | Baudet |
| 2010/0100945 A1 | 4/2010 | Ozzie et al. |
| 2010/0190475 A1 | 7/2010 | El-Kadri et al. |
| 2010/0205448 A1 | 8/2010 | Tarhan et al. |
| 2010/0241857 A1 | 9/2010 | Okude et al. |
| 2010/0251230 A1 | 9/2010 | O'Farrell et al. |
| 2010/0319434 A1 | 12/2010 | Weber et al. |
| 2011/0107203 A1 | 5/2011 | Nash et al. |
| 2011/0109170 A1 | 5/2011 | Chen et al. |
| 2011/0145099 A1 | 6/2011 | Berger et al. |
| 2011/0269424 A1 | 11/2011 | Multer et al. |
| 2012/0151346 A1 | 6/2012 | McClements, IV |

FOREIGN PATENT DOCUMENTS

| | | |
|---|---|---|
| CN | 1313697 | 2/2005 |
| EP | 0801487 | 10/1997 |
| EP | 0836131 | 4/1998 |
| EP | 0836301 | 4/1998 |
| EP | 0924917 | 6/1999 |
| EP | 0930593 | 7/1999 |
| EP | 1024441 | 2/2000 |
| EP | 0986225 | 3/2000 |
| EP | 1139608 | 10/2001 |
| EP | 1180890 | 2/2002 |
| EP | 1263244 | 12/2002 |
| EP | 1804418 | 4/2007 |
| EP | 2043012 | 1/2009 |
| GB | 2366050 | 6/2001 |
| JP | 7303146 | 11/1995 |
| JP | 10191453 | 7/1998 |
| JP | 11242620 | 9/1999 |
| JP | 11242677 | 9/1999 |
| JP | 2000232680 | 8/2000 |
| JP | 2000316053 | 11/2000 |
| JP | 2002142254 | 5/2002 |
| JP | 2002185575 | 6/2002 |
| JP | 2002247144 | 8/2002 |
| JP | 2002314689 | 10/2002 |
| JP | 2003259011 | 9/2003 |
| WO | 97/04391 | 2/1997 |
| WO | 97/39564 | 10/1997 |
| WO | 97/41520 | 11/1997 |
| WO | 98/03005 | 1/1998 |
| WO | 98/21648 | 5/1998 |
| WO | 98/29994 | 7/1998 |
| WO | 98/54662 | 12/1998 |
| WO | 98/56159 | 12/1998 |
| WO | 99/05813 | 2/1999 |
| WO | 99/06900 | 2/1999 |
| WO | 99/36870 | 7/1999 |
| WO | 99/40514 | 8/1999 |
| WO | 99/45451 | 9/1999 |
| WO | 99/45484 | 9/1999 |
| WO | 99/46701 | 9/1999 |
| WO | 99/50761 | 10/1999 |
| WO | 99/65256 | 12/1999 |
| WO | 00/11832 | 3/2000 |
| WO | 00/16222 | 3/2000 |
| WO | 00/29998 | 5/2000 |
| WO | 01/33874 | 5/2001 |
| WO | 01/71539 | 9/2001 |
| WO | 01/80535 | 9/2001 |
| WO | 02/17140 | 2/2002 |
| WO | 02/071219 | 9/2002 |
| WO | 03/056789 | 7/2003 |
| WO | 03/083716 | 10/2003 |
| WO | 2005/112586 | 12/2005 |

OTHER PUBLICATIONS

Gma, Using Microsoft Outlook 2000 for Contact Management, Active Technologies [online], [submitted by gma on Jan. 22, 2012] Retrieved from the Internet <URL: http://active-technologies.com/content/using-microsoft-outlook-2000-contact-management>.

Bob Temple, The Complete Idiot's Guide to Microsoft Outlook 2000, Que, A division of Macmillian Computer Publishing, 1999, pp. 158-167.

\* cited by examiner

Figure 19

| PersonaRecord |
|---|
| -string id |
| -datetime lastInteraction |
| -string firstName |
| -string lastName |
| -string middleName |
| -phone work |
| -phone home |
| -phone mobile |
| -phone business |
| -phone others |
| -string personalEmail |
| -string workEmail |
| -string otherEmail |
| -list dsEvents |
| -list participatingDSs |
| |

DEVICE MESSAGE MANAGEMENT SYSTEM

CLAIM OF PRIORITY

This patent application is a divisional application which claims priority under 35 U.S.C. 121 of the co-pending U.S. patent application Ser. No. 10/895,617, filed Jul. 21, 2004 entitled "DEVICE MESSAGE MANAGEMENT SYSTEM" which in turn claims the benefit of U.S. Provisional Application No. 60/489,163, "Smart Mail Filtering and Synchronization," filed on Jul. 21, 2003; and U.S. Provisional Application No. 60/565,199, "Device Message Management System," filed on Apr. 23, 2004; all of which are incorporated herein by reference.

BACKGROUND OF THE INVENTION

Field of the Invention

The invention relates to a system for managing messages and message attachments to limited capacity devices, and in particular to limited capacity wireless telephones.

Description of the Related Art

As wireless technologies proliferate, the number and types of devices which utilize such technologies grows at an ever-increasing rate. Although personal computers increasingly use wireless networks, devices which connect to wireless networks are more commonly ones with much more limited processing and memory capacity. Such limited capacity processing devices include PDAs, handheld computers, and mobile telephones. Though limited in power, users nevertheless demand an increasing number of features from such devices. Even wireless telephones have become more powerful with the inclusion of such features as address books, calendars and games. Many now include microprocessors, operating systems and memory which developers to provide limited applications for the phones.

Wireless phones have long been able to read messages via a Wireless Access Protocol (WAP) browser. In this type of system, the user on a wireless telephone connects via the wireless network to a server which enables the phone to read WAP enabled content. Most providers enable a user to access an email message account via the WAP browser, and/or provide short message service (SMS) messages directly to the user's phone. While useful, business users require access to their main email account, and the ability to respond from that account. For example, while an employee of Microsoft will have an address of employee@microsoft.com, the wireless phone message may not be available to connect to Microsoft's mail server to allow the user to access his business message at microsoft.com.

Other devices, which have been combined with wireless phones, such as Research In Motion's Blackberry device, provide a user with enhanced message capabilities and attachment handling. These devices are specifically configured to provide contact and message applications over a wireless network. In general, message received at a user's client computer or message server is forwarded via an agent on the server to the user's Blackberry device. Some provision for handling attachments is provided in a proprietary binary format. See. "Attachment Service", (http://www-.blackberry.com/products/pdfs/WPE-00024-001-attachment_service.pdf) Research in Motion White Paper, Research In Motion Limited, Copyright 2003.

The Blackberry solution is only available on certain types of wireless networks. The variety of different types of wireless phones makes the Research In Motion solution somewhat limited.

SMS allows users to receive abbreviated text messaging directly on the phone. Messages can actually be stored on the phone, but the storage available is limited to a very small amount of memory. In addition, no provision for handling attachments in SMS is available.

With the numerous different types of wireless phones and other communications devices available, a system which will enable a user to accurately manage their own business message account would be highly advantageous if accessible through a wireless phone.

SUMMARY OF THE INVENTION

The invention, roughly described comprises a system for managing email or other messaging and attachments to messages which are forwarded to devices having limited processing and memory capacity. In one embodiment, the system is designed for use with a synchronization system such as that described in U.S. Pat. No. 6,694,336 wherein the synchronization system accesses the user's message via any number of methods. In an alternative embodiment, the system of the present invention works in conjunction with a mail server directly. Through the system, a user can specify which messages are sent to the device during a sync (or other message access mechanism) and reduce or eliminate certain content. The user can also manipulate messages by, for example, retrieving, forwarding or faxing any eliminated or truncated content upon request. The user's point of connection is preserved by the present invention during message operations such as replying, forwarding and composing messages. In a further aspect, the Read/Unread status of a particular message is propagated to all devices in a user's personal information space. Messages delivered by the system have the message body reformatted if required to allow the message to be displayed on target device. In addition, large messages and attachments can be streamed to locally attached devices.

In one aspect, the invention is a method for management of messaging for devices having a limited processing capacity. The method includes the steps of: receiving a user configuration categorizing messages for the user by elements of the message; accessing the user message datastore upon receipt of at least one new message for the user to a user data store; comparing said at least one new message to a set of user specific rules; rendering a message summary including at least one link accessible by the processing device, the link enabling action with respect to the message when selected by the user; and outputting the message summary to a user device.

In a further aspect, the invention comprises a system including a user preferences dataset, including user device information and the user rule set. The system further includes a filtering engine including a rule set for providing messages to a user; and a user message datastore access engine, retrieving messages from a user's messaging service and providing the message to the filtering engine. A rendering engine is provided which is responsive to the filtering engine, the rendering engine converting messages into a limited capacity device readable format based on the user device information, and rendering a summary message indicating the state of messages received since a triggering event. A session manager retrieves messages from a message datastore, provides the messages to the filtering engine, and outputs messages to a user device.

In yet another aspect, the invention is a method of managing messages for limited capacity processing devices. The method includes the steps of: receiving a new message designated for a user; accessing a user configuration including a device configuration profile and at least one message handling rule; comparing the message to said at least one message handling rule; and outputting a summary message to the limited capacity device indicating a status of said at least one new message received, the summary message including at least one link enabling an action with respect to the message.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

The invention will be described with respect to the particular embodiments thereof. Other objects, features, and advantages of the invention will become apparent with reference to the specification and drawings in which:

FIG. 19 is an example of a persona record content.

DETAILED DESCRIPTION

Figure 1:
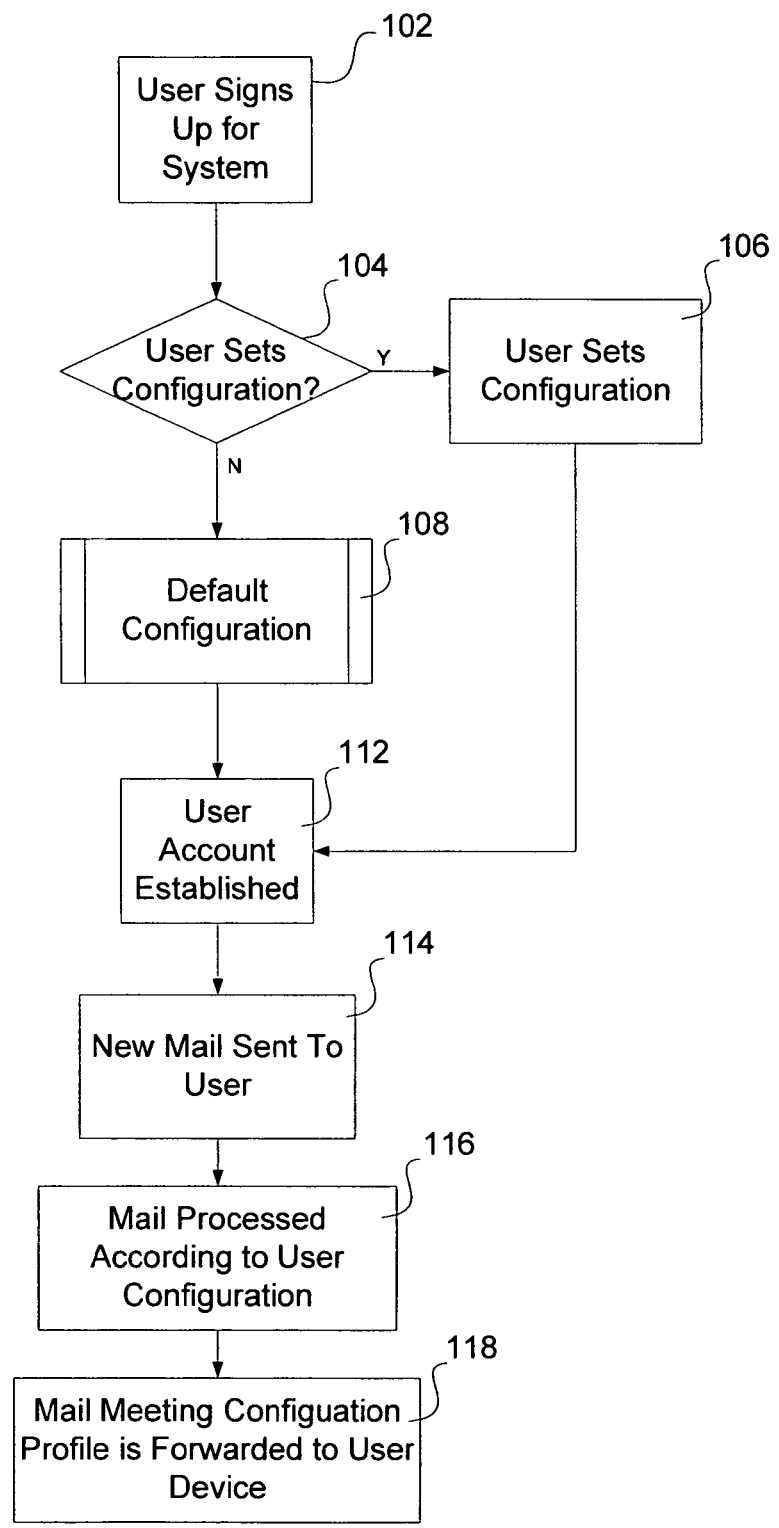
FIG. 1 is a flowchart representing how a user configures a system in accordance with the present invention.

The invention comprises a system for managing email, or other messaging, and attachments to messages which are forwarded to devices having limited processing and memory capacity. The message management system processes attachments and messages in accordance with a set of user settings defined for the system. The message management system of the present invention provides a number of unique features to a user of a limited capacity processing device. In one embodiment, the system is designed for use with a synchronization system such as that described U.S. Pat. No. 6,694,336 wherein the synchronization system accesses the user's message via any number of methods. In an alternative embodiment, the system of the present invention works in conjunction with a mail server directly and no separate sync system is required.

Using the system, a user can specify which messages are sent to the device during message delivery to the device, either through an agent operating on the device which renders email on the device, or during a sync via a sync agent (or other message access mechanism). This allows the user to reduce or eliminate certain content, optimizing use of the device's limited storage and processing capacity. The user can also manipulate messages by, for example, retrieving, forwarding or faxing any eliminated or truncated content upon request. The user's point of connection is preserved by the present invention during message operations such as replying, forwarding and composing messages. In a further aspect, the Read/Unread status of a particular message is propagated to all devices in a user's personal information space. Messages delivered by the system have the message body reformatted if required to allow the message to be displayed on target device. In addition, large messages and attachments can be streamed to locally attached devices.

In further embodiments, rule based manipulation of messages and interaction events automates the user's interactive experience using the limited processing device. Messages may be summarized, filtered, downloaded or otherwise manipulated (or passed through to the device) in a manner specified by the user.

As used herein, "personal information space" is a data store of information customized by, and on behalf of the user which contains both public data the user puts into their personal space, private events in the space, and other data objects such as text files or data files which belong to the user and which are manipulated by the user. The personal information space is defined by the content which is specific to and controlled by an individual user, generally entered by or under the control of the individual user, and which includes "public" events and data, those generally known to others, and "private" events and data which are not intended to be shared with others. It should be recognized that each of the aforementioned criteria is not exclusive or required, but defines characteristics of the term "personal information space" as that term is used herein. In this context, such information includes electronic files such as databases, text files, word processing files, and other application specific files, as well as contact information in personal information managers, PDAs and wireless phones. The personal information space may be contained on one or more physical devices, such as personal computers, wireless phones, personal digital assistants, and other limited capacity processing devices.

In order to implement the system of the present invention, a user configuration is created. The configuration contains the user's preferences on how the user wishes to handle messages, the type of limited capacity device the user has, the type of message system in use, whether the user uses a synchronization system and the like.

Initially, a user must provide this configuration information to the system. In one embodiment, the system may be provided as a service by a system administrator and the user begins using the system by signing-up for system service.

FIG. 1 shows a flow chart indicating how users participate in the system of the present invention. Initially, in step 102, a user signs up for the system. This process may comprise providing personal information about the user, the user's message account configuration (servicer ID, email address, etc.), information about the user's wireless account (carrier and wireless phone number), and other information about the user which enables the system to perform the tasks as described herein. In particular, signing up for the system may include downloading or installing software or code which enables the process of the present invention to operate. Such code may be installed on a personal computer, a limited processing device such as a wireless phone or hand-held computer, or any other type of processing device as is described herein. Such code may comprise an agent for accessing a message client running on a processing device the user normally uses to access the user's preferred message account, an agent which accesses the users message server directly, or a synchronization agent as described in U.S. Pat. No. 6,694,336. However, embodiments described herein do not require the use of such code on all devices. Providing information to the system for the set up process may also be performed using a forms-based web page to gather initial information and perform the following configuration steps.

The user's account can also be preconfigured, for example by the system administrator or the mobile carrier or on the phone by the manufacturer.

In step 104, the user makes the decision as to whether or not the user wishes to set their own configuration or use a default configuration. In addition to the user's operational preferences and requirements, the user can set rules and preferences on how messages directed to the user are handled. A default configuration may provide a number of standard filters for spam messages or for large attachments, for example. If the user chooses to set his own configuration, then at step 106 the user proceeds through a configuration process. This may include specifying up specific rules, answering questions and assigning preferences for the system to use in evaluating how to handle large messages and message attachments, messages from a particular user or group of users, and filtering characteristics such as subject or message keywords. If the user decides not to use a specific user configuration, then at step 108 a default configuration for the user is assigned. In a further embodiment, no user interaction is required during the setup phase.

Figure 2:
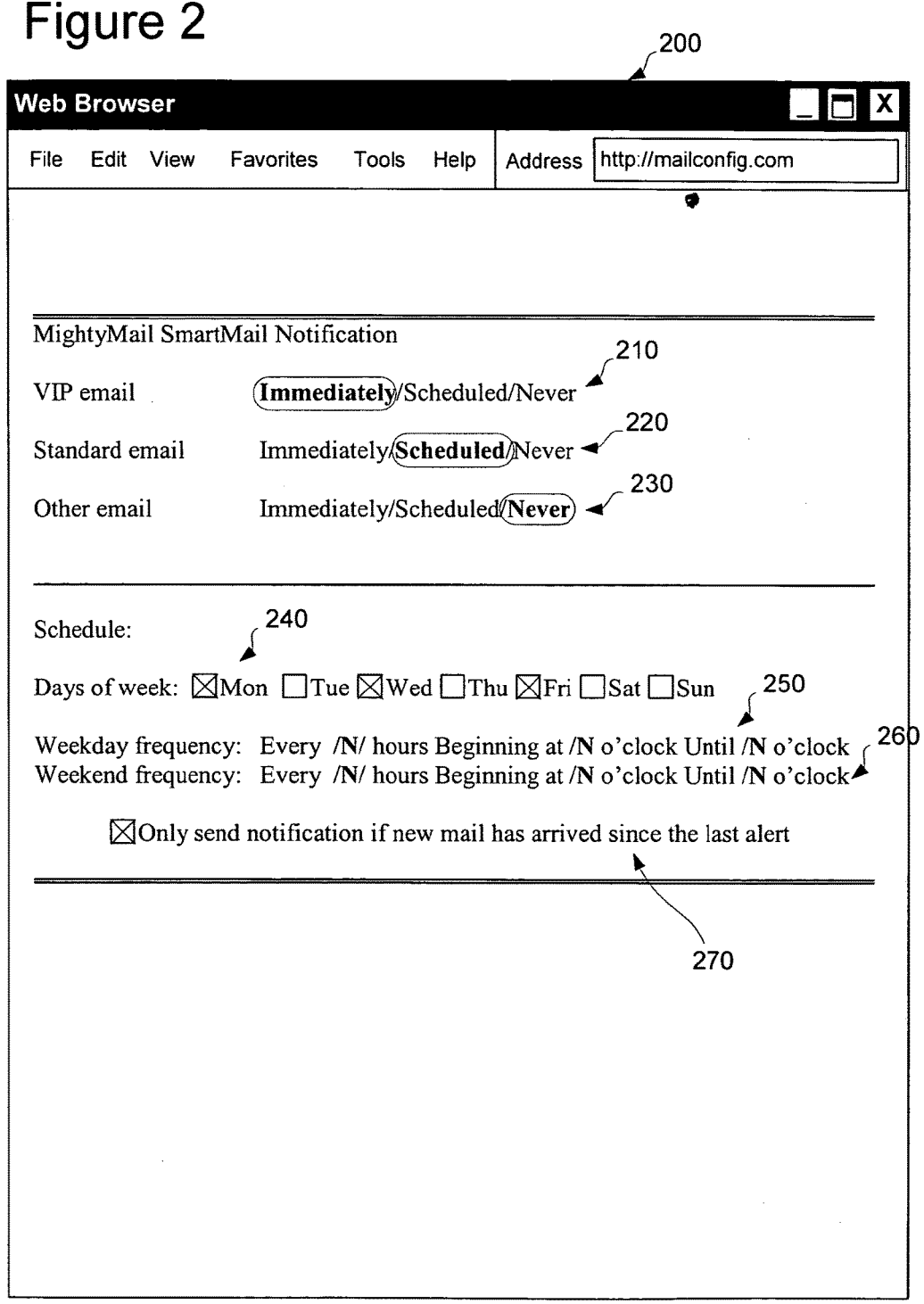
FIG. 2 is a user interface example of a configuration screen utilized in accordance with the present invention.

Portions of the process of step 106 may be implemented by providing the user with a set of interface screens on a computer during the set-up process. FIG. 2 is an example of a user interface screen allowing a user to define a portion of the user's personal configuration in the system of the present invention. In general; the user can determine any number of filters which allow messages or messages to be passed to the user on the limited capacity processing device. By initially setting filters that eliminate or allow certain types of messages which are of interest to the user, this system allows only those messages of genuine interest to the user, or in accordance with the user's preferences, to be passed along to the device. This eliminates a high degree of processing on the limited capacity processing device.

Shown in FIG. 2 is a configuration screen implemented in a World Wide Web browser 200. In FIG. 2, it should be recognized that the configuration may alternatively be performed by providing a standalone application on a processing device. Moreover, while the screens shown in FIGS. 2-3 are in a personal computer web browser, the configuration may alternatively be provided via other browsers, such as WAP browsers, and other technologies, such as SMS. For example, configuration of the user's configuration may be provided via the mobile device itself.

FIG. 2 shows three sets of timing rules—210, 220, and 230—for delivery of email to three groups of users. In this configuration, messages are classified into three categories: VIP mail, standard mail, and other mail. VIP mail might be a message provided from a class of individuals that the user designates as a very important persons (VIPs). As shown in FIG. 2 at line 210, the user may desire to have all messages in this category sent to the user immediately. Alternatively, the users can define a schedule when messages are sent to the user from people in this category or have people in this category's message never sent to the user. For example, the user may wish to turn off all mail forwarding while the user is normally at the user's place of work and has access to messaging through other means. Likewise, in step 220, standard message may be sent immediately, on a schedule, or never. In FIG. 2, the "scheduled" option is selected for standard email. Any other message, shown at line 230, is selected to "never" be sent to the user. While message is shown as classified in certain categories in FIG. 2, it should be recognized that any other level of assignment of priority to individual users is contemplated by the present invention. The user may be allowed to record any number of individual message addresses and assign priority values to those addresses. For example, a numerical rating of individual users in a user's preference set may be utilized in accordance with the present invention. In this case, the rules set forth at lines 210, 220, and 230 may have a numerical nature so that, for example, VIPs have numerical rating of 5 whereas "others" have a numerical rating of zero. It would be understood that any number of different configurations and granularity in filtering individual user messages can be provided.

The lower half of FIG. 2 shows a manner in which a schedule for the "scheduled" options of FIGS. 210, 220, and 230 may be provided. In FIG. 2, the frequency of time may be sent by selecting the days of the week 240, and how often in time matters are sent on the given selected days. For example, a weekday frequency is set at line 250 and a weekend frequency is set at line 260. A further option might be to allow a user to only send a notification if new message has arrived since the last alert, as indicated at reference number 270.

As explained below, there are numerous ways the system gains access to a user's email. The system can be configured to access messages immediately upon receipt, or upon some other triggering event, such as a sync process being implemented. In either case, rule 270 would only provide a notification once access to the messages has been accomplished by the system.

Figure 3A:
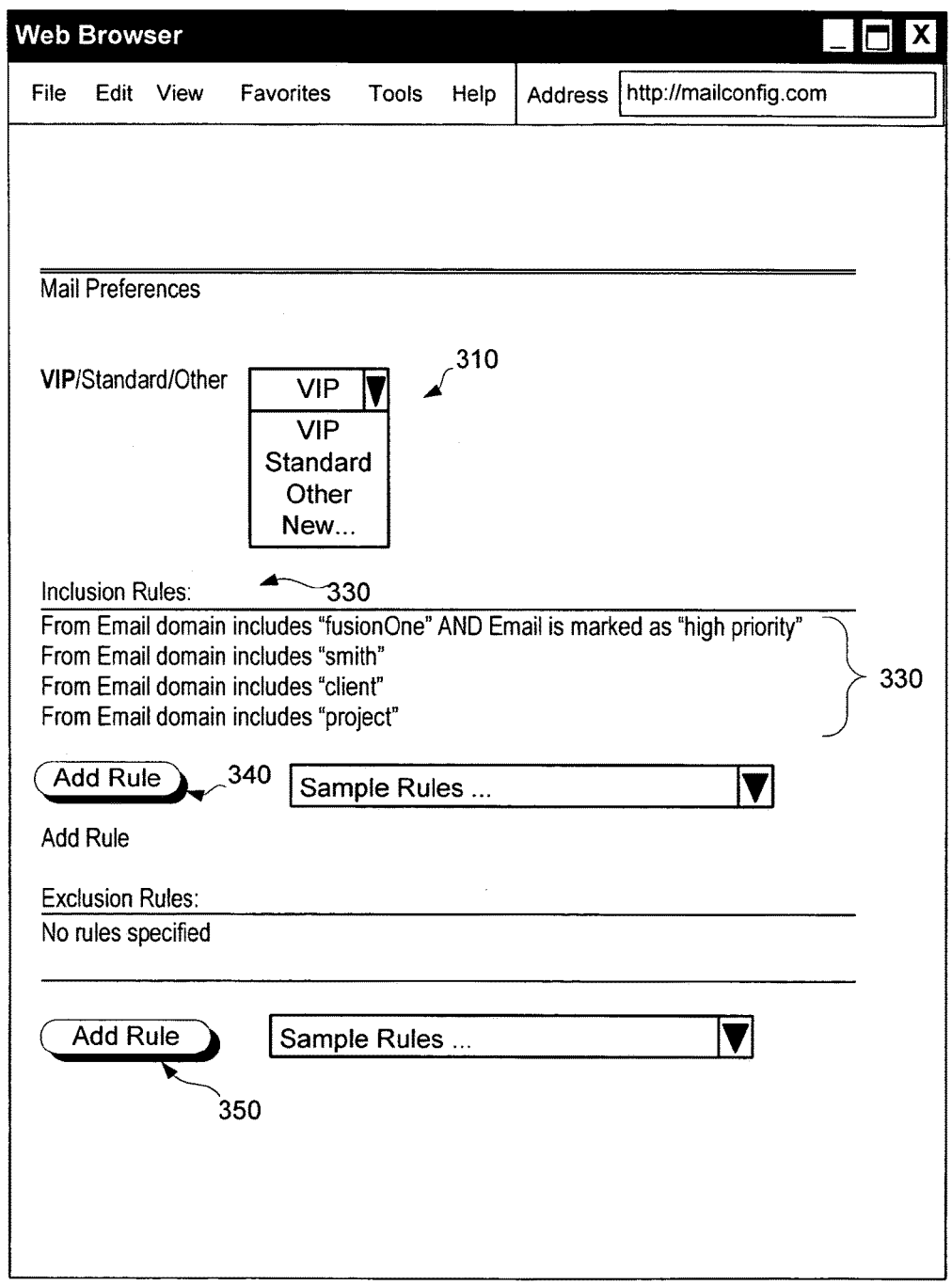
FIGS. 3A and 3B are further examples of a user interface screen configuring rules for filtering message in accordance with the present invention.
Figure 3B:
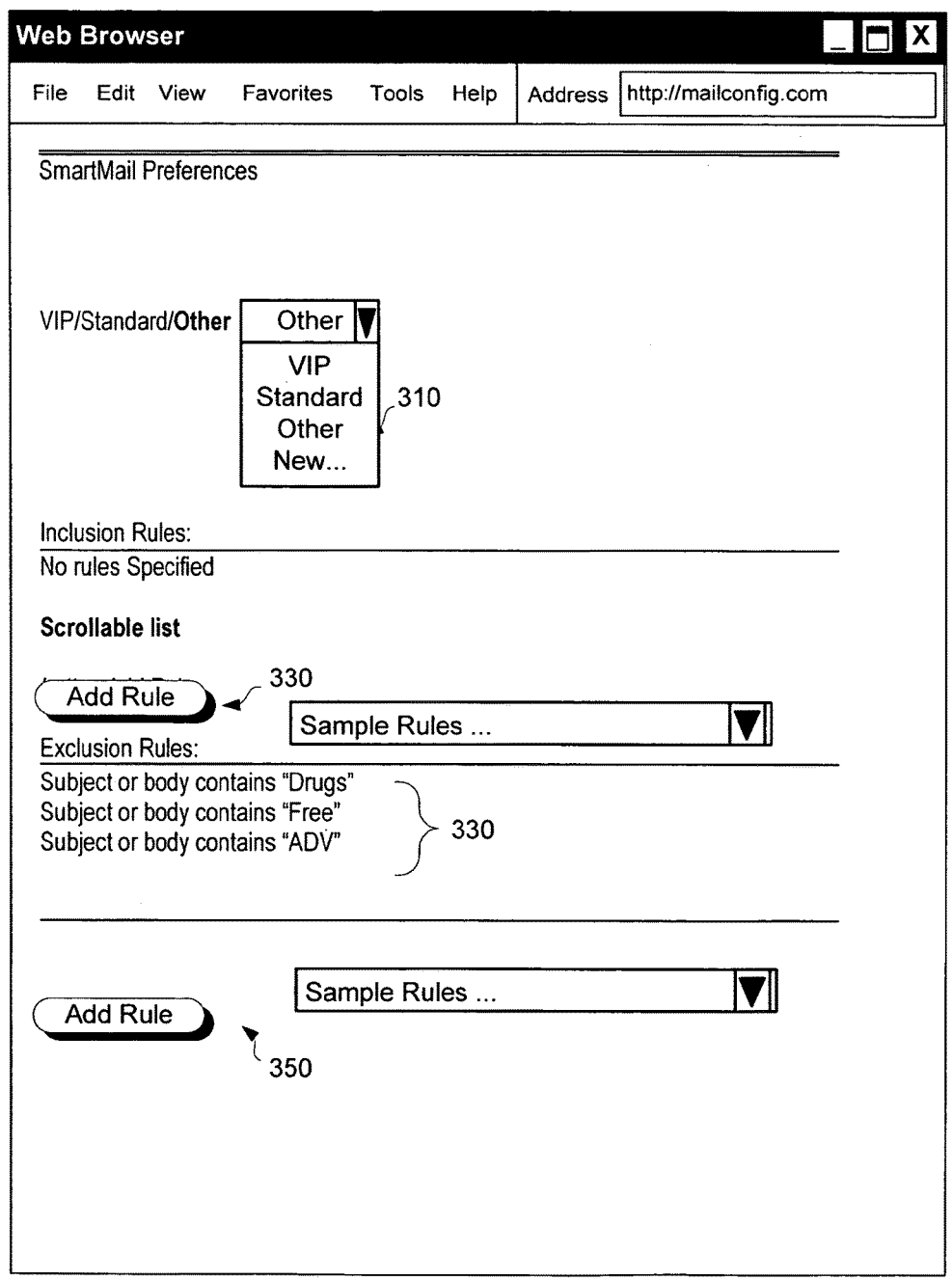

FIGS. 3A and 3B show additional sample screens for adding filtering rules for messages to the system. Such screens allow further granularity in configuring the system in step 106 of FIG. 1. In FIGS. 3A and 3B, the rules are added to specific levels of users, however it will be understood that the rules need not be segregated by user or user group. Users may include or exclude mail items based on a sender's "To" address, priority, key words in the subject body, or any other number of options.

FIG. 3A shows an example method for implementing an inclusion rule in the system of the present invention. An inclusion rule would allow message to pass, assuming all the characteristics of the rule are met. For example, at line 310, a pull-down menu is used to allow a user to select one of the user groups. Groups may be pre-defined or user defines ("New . . . "). The pull down shows that the user is configuring a VIP set of recipients. A set of inclusion rules 330 specify messages which are allowed or desired by the user on the limited capacity processing device. Rules 330 specify that the domain include the word "fusionOne" and the message be marked high priority, or that the domain includes the word "Smith", or the domain includes the word "customer", or the domain includes the word "project 1". By selecting button 340, the user has an option to add additional rules using a pull down menu 345 of sample rules or by manually entering specific rules. It should be noted that no exclusion rules are shown in FIG. 3A, but that the user is allowed to add exclusion rules by selecting the button 350.

FIG. 3B shows an example of an exclusion rule. In this case, the exclusion rule excludes anything in the "other" category which contains the word "free drugs," "advertisement," or "ADV." Mail items messages may be excluded based on the sender, the To address, the priority, key words in the subject or body, and any other filtering method.

In a further aspect, the intelligence features of co-pending patent application Ser. No. 10/704,433 entitled "Personal Information Space Management System and Method", assigned to the assignee of the present application, the contents of which are specifically incorporated herein by reference, are utilized. This application describes a method for intelligently filtering messages and personal information in a communication system. Features of the system described therein may be incorporated and combined with those of the system of the present invention to provide a more complete user experience.

In the system of application Ser. No. 10/704,433, the user is provided with a number of options to process messages according to a user or system defined rating system using information culled from the messages or the user's personal information space, may be used to catalog messages into containers such as "Urgent", "Normal", "Meeting Requests" and "other". Additional embodiments of the system implement this and other features in conjunction with the message delivery features described above.

In one embodiment of the present invention, email received by a user is broken into a series of collections such as "Urgent", "Standard (Normal)", "Meeting Requests" and "other". The collections are governed by user configurable options. The user may add additional collections as required, or allow the system to provide default collections. System provided default rules allow the user to immediately use the system with the default collections. For example, a default spam email rule may define that spam email is prohibited from being transmitted to the user's client device.

In one example, default settings for a person to be classified in a "normal" collection are that the sender belongs to one's home domain, the sender is found in the user's address book, a copied recipient is in the user's address book, the sender is found in the user's sent items folder, or the message is marked as urgent. The "urgent" rule defaults may promote items to Urgent when, for example, an item in the "normal" collection is market or flagged urgent, when the sender is in a user defined list of VIP senders, or when a member of a VIP list is copied as a recipient.

Returning to FIG. 1, once the configuration is established at step 106 or 108, at step 112, the user account is established. It should be recognized that the user configuration set at step 106 may be modified as often as desired by a user. The dashed line between step 112 and step 114 indicates that the steps following step 112 may be separated in time; steps 114 through 118 need not be performed in any temporal relationship to the preceding steps. Once the user account is established in step 112, when a new message is sent to the user at step 114, then at step 116 one or more messages are intercepted by the system and processed according to the user configuration. It should be recognized that in this context, new mail is mail that is not marked "read" by another device in the user's personal information space. For example, if the rules set forth in the user configuration specify that the user not be sent messages from 8 am to 5 pm during the week, and messages received during that time are received, read and/or otherwise processed by the user with another processing device, they will not be operated on by the system of the present invention unless the system rules are configured to do so.

In step 118, messages meeting the configuration profile may be forwarded to a viewing device. Alternatively, a summary of the messages may be forwarded to the user device, enabling the user to call additional functions to manage messages in accordance with the teachings herein.

FIGS. 4-7 show a number of embodiments of physical implementations of the system of the present invention. In accordance with the present invention, messages can enter the system in a number of ways: through the user's personal computer client, which operates with a synchronization system such as that described in U.S. Pat. No. 6,694,336; through a user's message server, which has a component for the system of the present invention running on it; via an intermediate system server interacting with the user's messaging server; or via some other source, such as a web personal information manager. In each case, the system has access to the message and any information required to decrypt the message, if required.

In each of the embodiments described below, the system of the present invention scans the user's datastore for new messages or, alternatively, receives notification that new message has arrived through some source. When new message is detected, the server initiates a system session with the user's limited capacity processing device. Generally, the first step of this process is to gather the new message. This may require decrypting change logs in the case of a system using the synchronization system of U.S. Pat. No. 6,694,336 or may simply involve enumerating the message form an email server. A list of message data is retrieved, including: the sender of message, the recipients of message, the size of message, the number, size, and type of message attachments; the subject of message and the message body content.

Once the complete set data for the new message has been determined, the system stores this information in a cache and passes control to a filtering engine. This engine uses the user's configuration preferences or rule set to determine which message to send to the user's limited capacity processing device. If none of the messages is eligible for processing, the process stops. If a message passes the filter, the process begins the delivery stage of the procedure.

Figure 4:
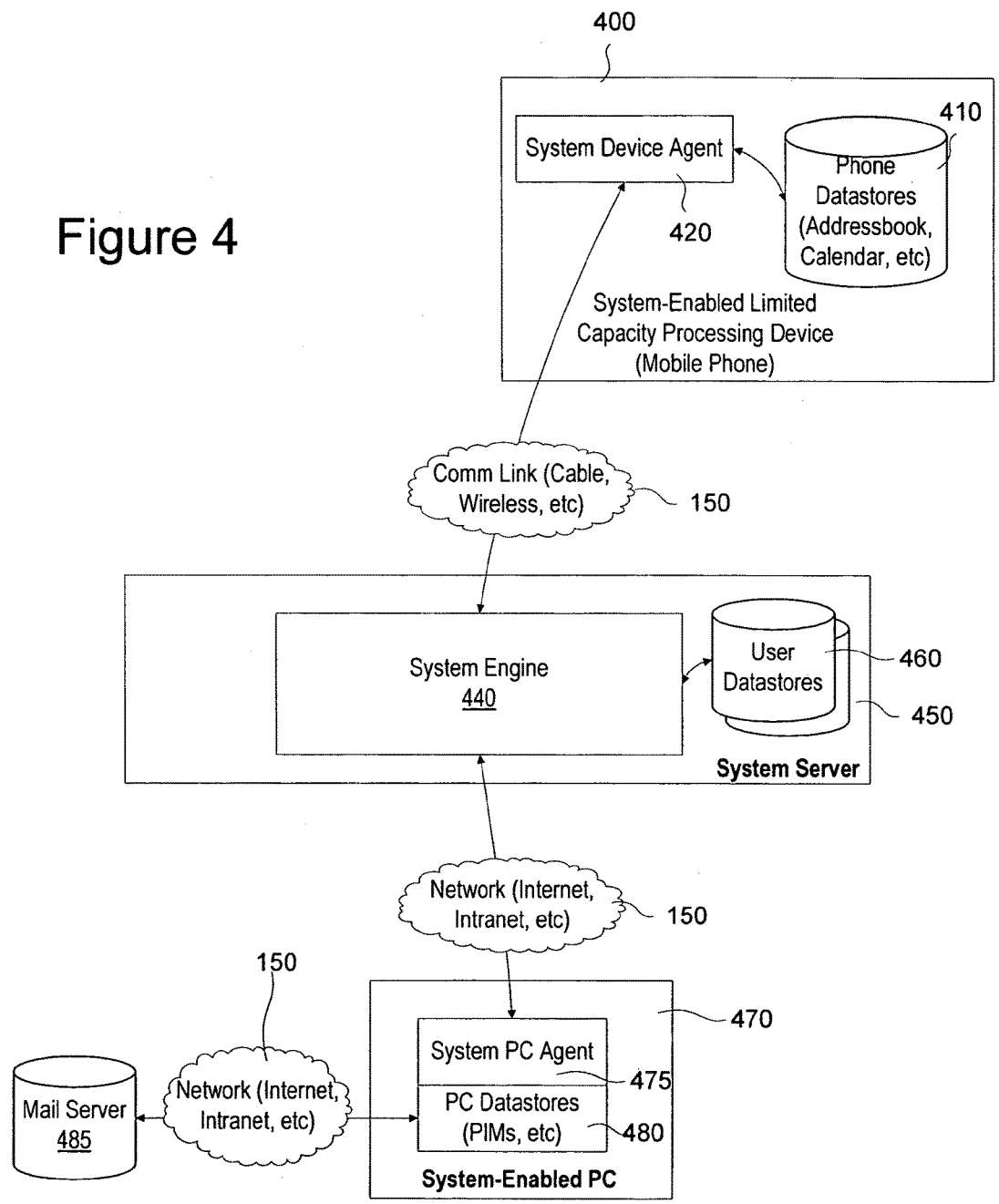
FIG. 4 is a block diagram illustrating a first embodiment of the system of the present invention.

FIG. 4 shows a block diagram of the first exemplary physical configuration for operating the system in accordance with the present invention. In the configuration shown in FIG. 4 message enters the system by synchronization with the central system as described in U.S. Pat. No. 6,694,336. In FIG. 4, a system server 450 is shown which includes a system engine 440 and user datastores 460. The system server 450 is connected via one or more networks 150 to both a system enabled limited capacity processing device 400, such as a mobile phone, and a system enabled personal computing device or other processing device 470. Network 150 may comprise any combination of physical networks, public or private, or a combination of public and private networks such as the Internet, or wireless communications link using any of the number of widely available, including wireless and other network, supporting commonly used protocols such as, for example, TCP/IP. In this embodiment of the present invention, a limited processing device 400 includes datastores 410 which may include an address book, calendar, or other information specific to the user and containing at least a portion of the user's personal information space, as well as code for implementing a system phone agent 420. The functions of the system device agent 420 will be described hereafter.

Also shown in FIG. 4, processing system 470, which may comprise a system enabled personal computer, is in communication with a mail server 485. Mail server 485 may be coupled by one or more networks 150 to enable messages to be communicated to the system enabled processing device 470 and any of a number of formats. The processing device 470 includes code for implementing a system PC agent 475 as well as datastores 480 which may include a portion of the personal information space of the user. Such personal information may include personal information management data bases, contact data bases, and the like. This system is advantageous for allowing a system administrator to handle a number of users simultaneously.

Figure 5:
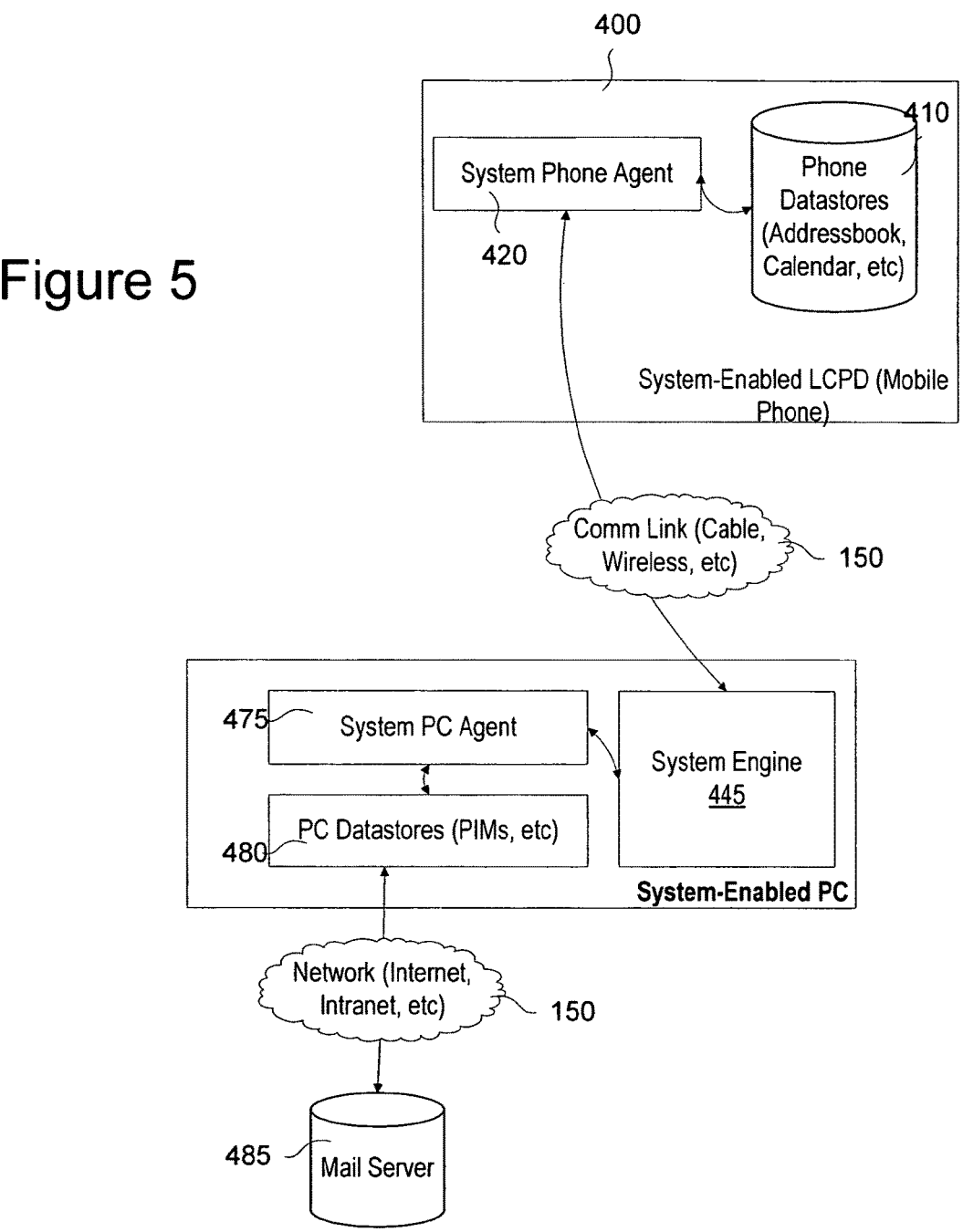
FIG. 5 is a block diagram illustrating a second embodiment of a system in accordance with the present invention.
Figure 6:
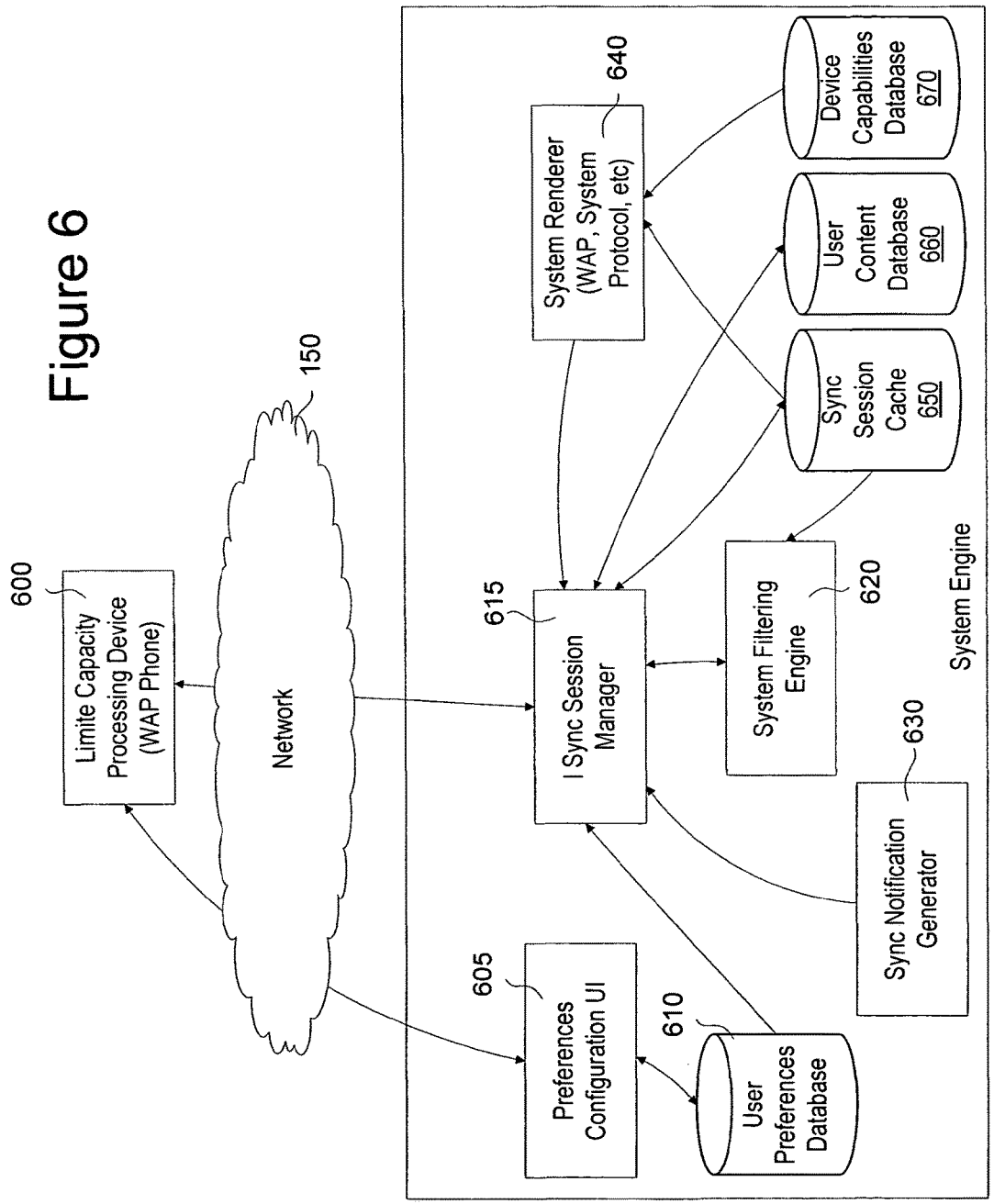
FIG. 6 is a block diagram illustrating a system engine in additional detail in accordance with the present invention.

FIG. 5 shows an alternative configuration wherein the system enabled server 450 is eliminated. In this embodiment, the processing device 470 communicates directly with a user's limited capacity device via network 150. Elements of the system which are the same as those enumerated in FIG. 4 share like reference numerals. In this configuration, a system engine 445 is provided on the system enabled processing device 470 in conjunction with a PC agent 475. The system engine 445 communicates via one or more networks 150 with the limited capacity processing device agent 420 on the limited processing device 400. Certain differences between the system engine 440 and system engine 445 enabled on the server or system enabled PC, respectively, will be described hereinafter. Datastores 480 contain information provided to the system enabled processing device 470 from a mail server 485 via a network 150. It should be recognized that the mail server may be provided directly on the system enabled processing device 470. This configuration is advantageous for a single user communicating with one or more limited capacity devices:

FIG. 6 shows a block diagram of a first embodiment of the system engine 440. In FIG. 6, the engine is designed for implementing the system of the present invention with a wireless access protocol WAP phone 600 as the limited capacity processing device. However, as described herein, the system of the present invention may utilize a device-based application to communicate with the system engine, as described below. As such, in the embodiment shown in FIGS. 4 and 5, software or code may be utilized to implement the system phone agent 420. In the system of FIG. 6, any phone which is capable of implementing a WAP browser can utilize the system of the present invention by connecting to one or more networks 150 to the system engine 440. Such devices are now commonly available. Elements of the system engine 645 not required in the WAP embodiment or for a personal processing system embodiment (engine 445) will be discussed herein. System engine 645 includes a user preferences database 610, and a preferences and configuration user interface 605. The preferences and configuration user interface 605 allows the user to perform a customization of preferences described with respect to FIGS. 1-3 in setting up the user's general configuration. System engine 645 includes the system renderer 640, which enables the content to be provided to the limited capacity processing devices. A content database 660 includes user message and attachment content stored on a per user or per sync-session basis. A sync session cache 650 stores information messages during the filtering process and therefore communicates with the renderer 640 as well as a system filtering engine 620. Operational control in the present system is provided by a sync session manager 615 which controls provision of information to the WAP phone. A device capabilities database 670 includes information for the render on the capabilities of each user's limited capacity processing device. A notification generator 630 may be a timed or user initiated action that initializes a sync process in accordance with U.S. Pat. No. 6,694,336. In a personal processing device embodiment of the present invention, a system engine would not need a user preferences database containing multiple users; rather, a record of any individual users information is contained therein.

In the system shown in FIGS. 4-5, messages enter the system via a mail server 485, such as an Exchange server (available from Microsoft Corporation), and/or via a sync system which utilizes elements shown in FIG. 6.

Figure 7:
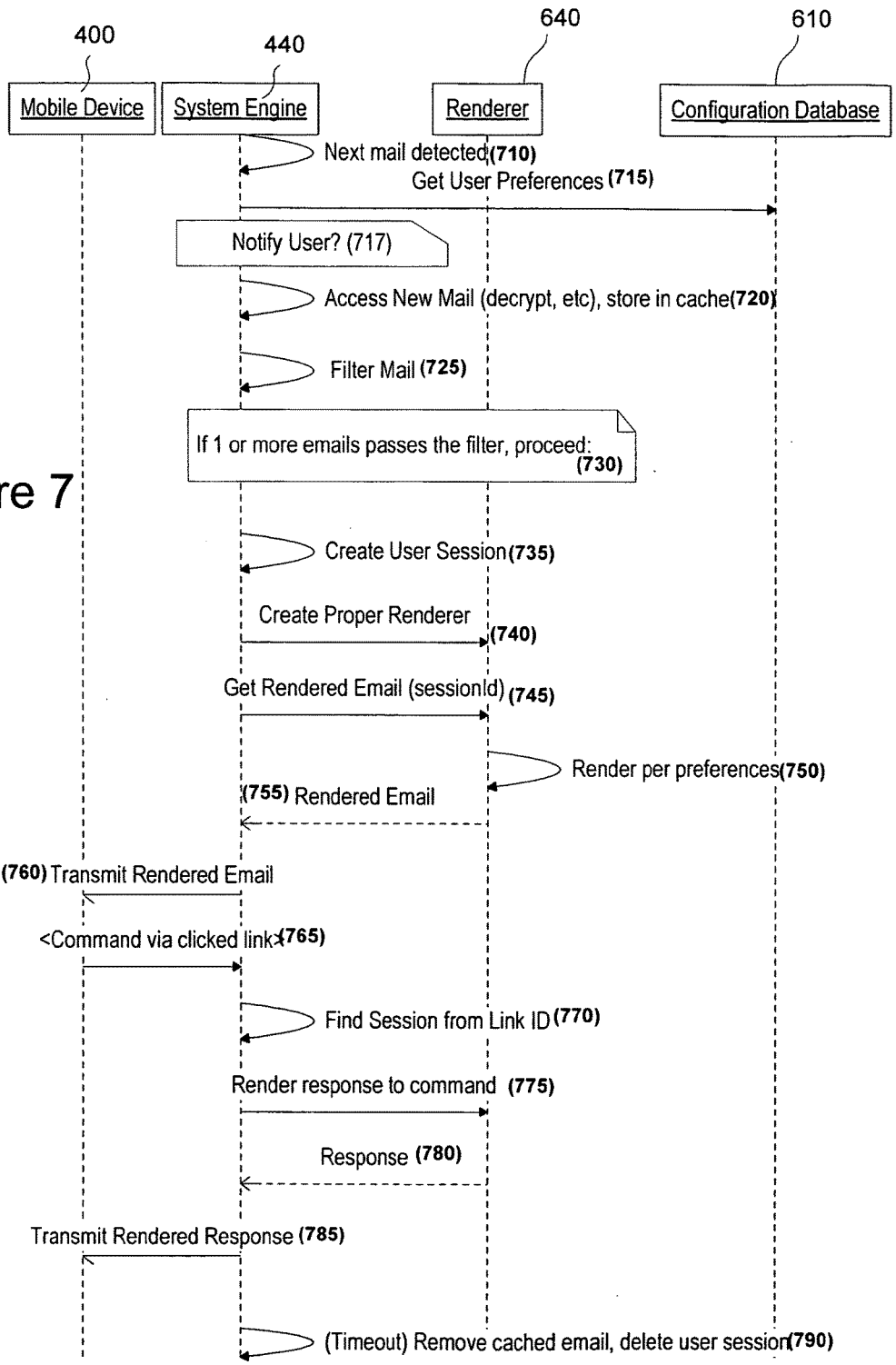
FIG. 7 is a sequence diagram illustrating the transactions and communications between various elements of the embodiment of the invention shown in FIG. 4.

The process and functions of the various components of FIGS. 4-6 are described in the process of FIG. 7. FIG. 7 shows the processes and communications between a limited capacity processing device, such as a mobile device 400, system engine 440, renderer 640, and configuration database 610. Other elements of the system engine 440 and their operation in the system will also be described in the process of FIG. 7.

Initially, a message enters the system for processing at step 710. As noted above, the message may be a new message received by a user. Messages may be detected by determining a message has entered the user's mail server directly and/or by performing a sync process in accordance with U.S. Pat. No. 6,694,336. The sync initiating event may be an automated or manually initiated sync triggering event. In this embodiment; the system utilizes a synchronization system such as that described in U.S. Pat. No. 6,694,336. Operation in the steps of FIG. 7 therefore occurs under control of the sync session manager 615. However, it should be understood that the sync system is not required for operation of the present invention.

When a message is detected at step 710, user preferences are retrieved at step 715 from the user preferences database 620. The preferences are configured in the user preferences database 610 via the preferences configuration UI 605. User preferences may include a mail or sync system access password and a digital identifier, such as a private PGP key or digital certificate used to decrypt encrypted email. An initial user preference may be a filter which determines when a user is notified of an email receipt. For example, a user may choose to be notified of all emails as soon as they arrive, or only on timed intervals. If the system passes this initial preferences notification determination, the method proceeds at step 720. At step 720, the new message is accessed and stored. Access to the new message may require decrypting the message and storing it in a user cache during step 720. In a sync system, it may require decrypting and manipulating change logs as described in U.S. Pat. No. 6,694,336. The sync session cache 650 stores the message for this particular step. Alternatively, where direct access to an email server is utilized, step 720 may simply require providing the user's access password to the email server to retrieve the mail for processing as described below. PGP and/or digital certificate decryption of the message itself may be provided at this step.

At step 725, the mail is filtered in accordance with the user filter preferences stored in the preferences database 610 as established by the user as described above. At step 730, if one or more messages passes the filter, the following steps in the diagram shown in FIG. 7 are performed.

In the following steps, based on the message content that passed the filter, the system formats a new email or a "new mail notification" message to be sent to the device. This message is generated using the device-specific configured renderer (for example, a WAP renderer, or in the case of a device with a system client, a system specific renderer). The message content depends on the user's configuration and includes information such the number and types of messages (VIP, Standard, Other). In the case of the WAP renderer, the message may include links for each message category—in the URL of the link (hidden from the user) are parameters that identify the sync session. In the case of a system enabled client, the communications protocol may contain this information. Additionally, the specific capabilities of the user's device are considered when rendering the page. These capabilities are maintained in a database; the user's account includes a link to one of these fields (or, alternately, a custom set of capabilities)

To complete these tasks, at step 735, a new user session is created by the system engine 740. The user session is a persistent container for all actions with the user during a particular time period. Each session is assigned a session ID which, in one embodiment, is built into communications with the user and messages stored in the system cache. At step 740, the proper renderer for the message and/or attachment to the message is created. If the message is to be provided for a WAP phone, the system or renderer creates a WAP renderer. The type of renderer required for the particular device 400 will be stored in the device capabilities database 670. For example, if the device is a WAP phone, it will be necessary for system engine 440 to know that the device includes a WAP phone. Alternative configurations can provide message and attachments to the limited processing device 400 using a binary format which can be decrypted by the system phone agent 420. Any number of different protocols and communication schemes may be utilized in accordance with the present invention. Next, returning to FIG. 7, at step 745, the rendered message is retrieved using the sessionid created at step 735. As will be noted below, the System may be configured retrieve all or only a part of a message. For example, the system may be configured to retrieve only a limited number of bytes for users not indicated to be "VIP" status. Likewise, if the message contains an attachment, the attachment may be downloaded in whole or in part. In a sync system embodiment, the sessionID builds a link back to the particular sync session employed by the user in retrieving mail. At step 750, the renderer 740 creates a rendered email in accordance with the preferences defined by the user of the message. At step 755, the rendered message is returned to the sync session manager 715. The rendered message includes the sessionid.

At step 760, rendered message is provided to a user. The message provided at step 760 may take a number of forms. It may be the message itself, or may be a summary message indicating the status of all messages processed by the system. The renderer, using the user's preferences for number of bytes to preview and other settings, composes the message and the server transmits it to the device.

Figure 10:
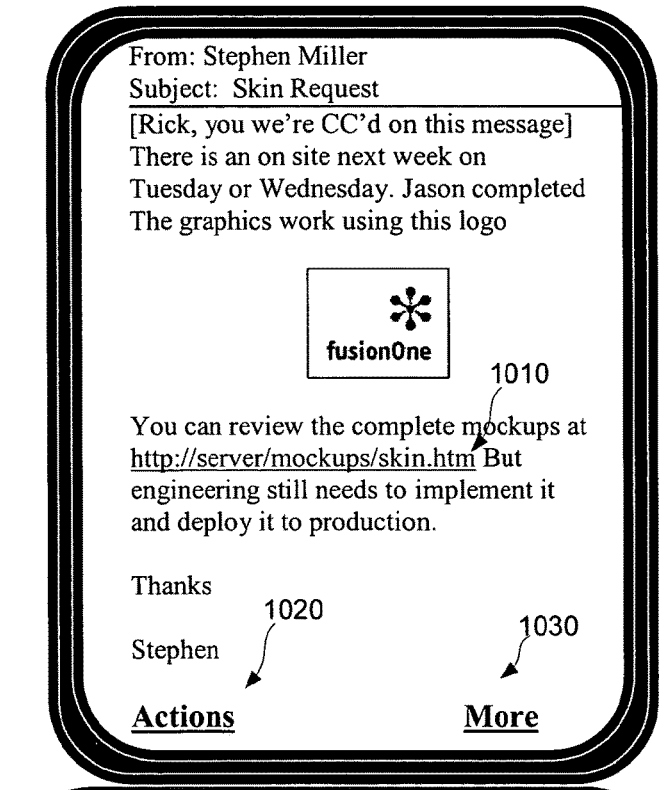
FIG. 10 is a depiction of a rendering of a message as it might be displayed on a wireless phone.

An example of an entire message is shown in FIG. 10. FIG. 10 shows the screen portion of a limited processing device, such as a mobile phone. As shown therein, a message from Steven Miller about a skin request is displayed. A link at 1010 allows the user to select the link and proceed to the linked item. It should be noted that a "link" as represented in the interface examples provided herein may be a segment of text or a graphical item that serves as a cross-reference to a function or between parts of a text document to an executable file. Also shown are an "actions" link 1020, and a "more" link 1030 which allows the user to view additional portions of the message if it is available.

Figure 8:
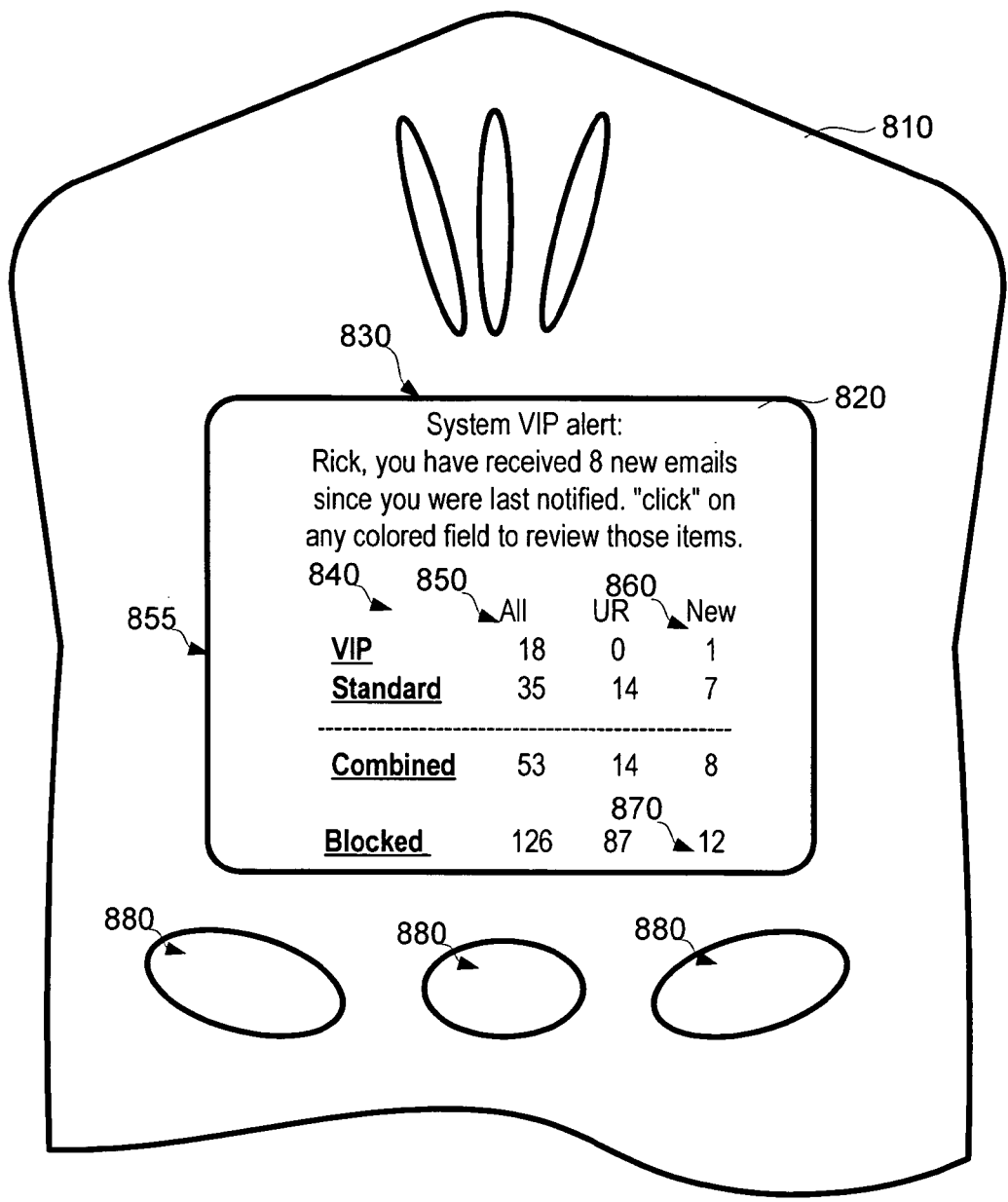
FIG. 8 is a representation of a portion of a wireless phone showing a summary SMS message displayed on the wireless phone.

Alternatively, the system of the present invention may provide summaries of the messages, or an alert screen. FIG. 8 shows a portion of wireless phone 810 and a sample alert screen on the device's display 820. Alert screen 830 is characterized therein as a "system VIP alert" having a personalized summary for the user. In this case, the summary indicates that the user has received eight new messages since the user was last notified. The messages in the user's system are classified in the "VIP" and "standard" messages meeting the rules specified in the user configuration. All messages are shown at column 840, user related messages are shown at line 850, and new messages are shown at line 860. Blocked messages are shown in row 870. Each of the labels, VIP, standard, and blocked, may be provided as a link which the user can select by using navigation buttons 880 on the phone or other device to move about the screen 820 in accordance with a the particular manner in which the phone functions.

Returning to the method of FIG. 7, once the user selects the link, this command is returned at step 765, and the method proceeds accordingly. This command may include the command instruction, a userID, and a session ID along with other information for the server. When the user chooses a category (clicking on the link in a WAP phone, for example), the system server receives the request via the URL. The server decodes the URL, finds the sync session, and requests the appropriate functions to respond to the command instruction in the link.

At step 770, the system engine determines the session by using the sessionID and renders a response to the command instruction to the renderer at step 775. The renderer will return a response at step 780' and the rendered response will be returned to the limited capacity processing device at step 785. This will continue in accordance with the actions of the user and for any number of messages at step 710 and link selections at step 765 until a time out when the user session is terminated at step 790. A session clean-up process may be used to free any resources required by the user session at this step.

Figure 9:
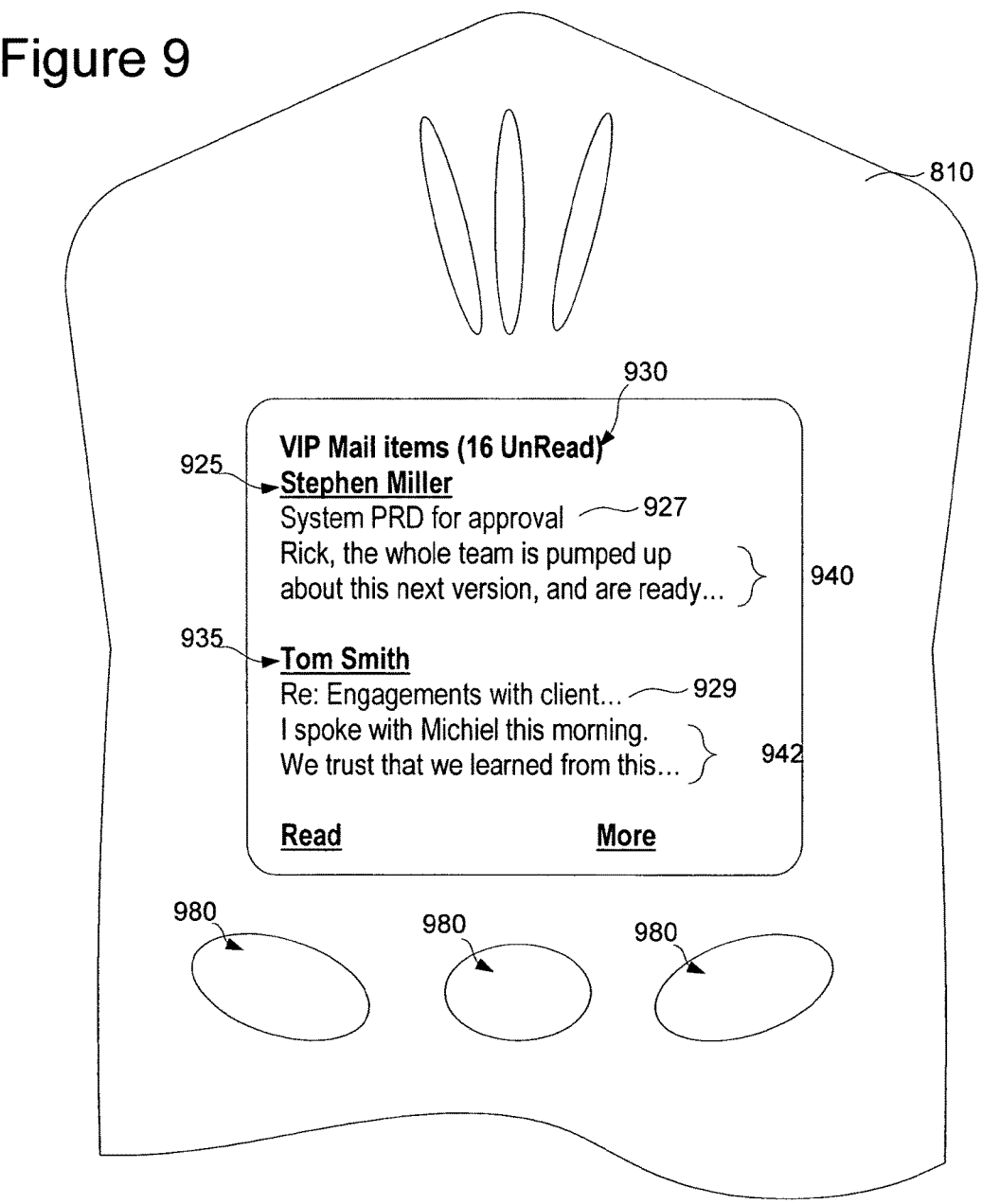
FIG. 9 is a depiction of a wireless phone showing a summary listing of messages which might be displayed on the phone.

FIG. 9 shows one possible an alternative of a rendered response at step 780 when the VIP link in FIG. 8 is selected, providing a summary of messages to the user. In FIG. 9, the summary of the first two of the 16 unread VIP messages shows a user name 925, 935, a "re:" line 927, 929, and a text portion of each message 940, 942. Note that the preview may just include a list of To/Subject fields, or the first n bytes in the message. These options may be configurable by the user and are maintained in the user's preferences database.

A user may click on a linked portion of the message preview such as the name of the sender to retrieve a particular message. Using the same system described above, the request returns to the server and is handled by the renderer utilizing state information maintained by the Sync Session Manager. The details of how the message is rendered, such as whether or not attachments are included (or some threshold for attachment size, etc) whether or not to embed pictures, etc, are controlled by the user's preferences.

User names 925, 935 may be implemented as links and returned to the system as commands at step 765, as a user navigates about screen 820 in accordance with the particular functions of phone 810. When a user selects a particular message or name such as name 925, a full message such as that shown in FIG. 10 may be rendered.

Figure 11:
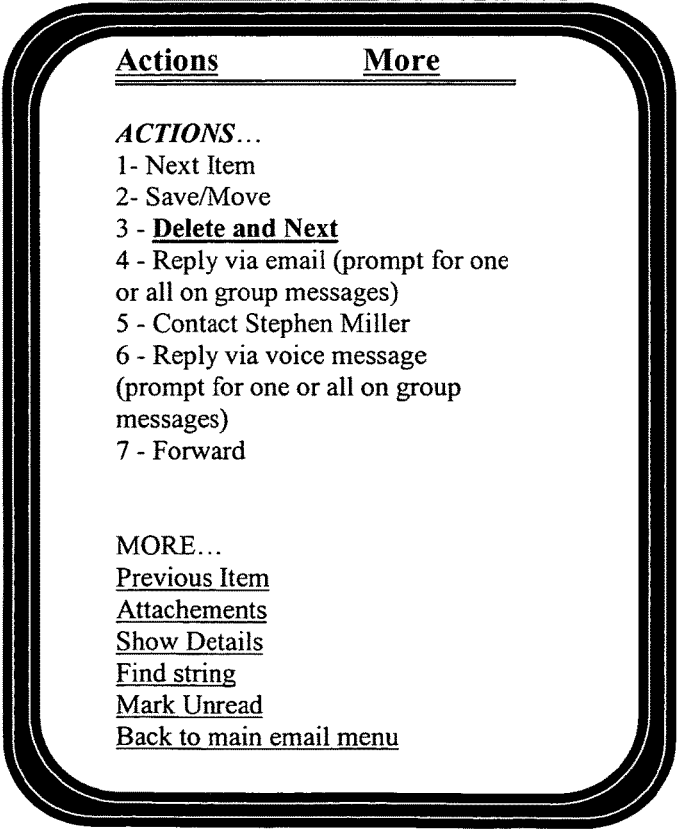
FIG. 11 is a depiction of a menu listing as it might be depicted and rendered on a wireless phone.

As noted above, FIG. 10 is a sample message rendered on a limited capacity processing device screen such as a phone. The message contains links including the "more" 1030 and "actions" 1020 links. Selecting the actions link 1020 in FIG. 10 allows the system to provide a list of actions that the user can take as shown in FIG. 11. When displaying a message, a number of options (or links, in the case of a WAP phone) are available. As shown in FIG. 11, the actions which the user may request are to view the next item, save/remove this message, delete the message, reply via message, contact the sender of the message directly, reply via a voice message or forward the message. Selecting a "more" link in FIG. 11 allows the user to move to the previous item, handle attachments, show message details, define a particular text string in the message, to mark the message as unread, or to move back to the message menu.

Figure 12:
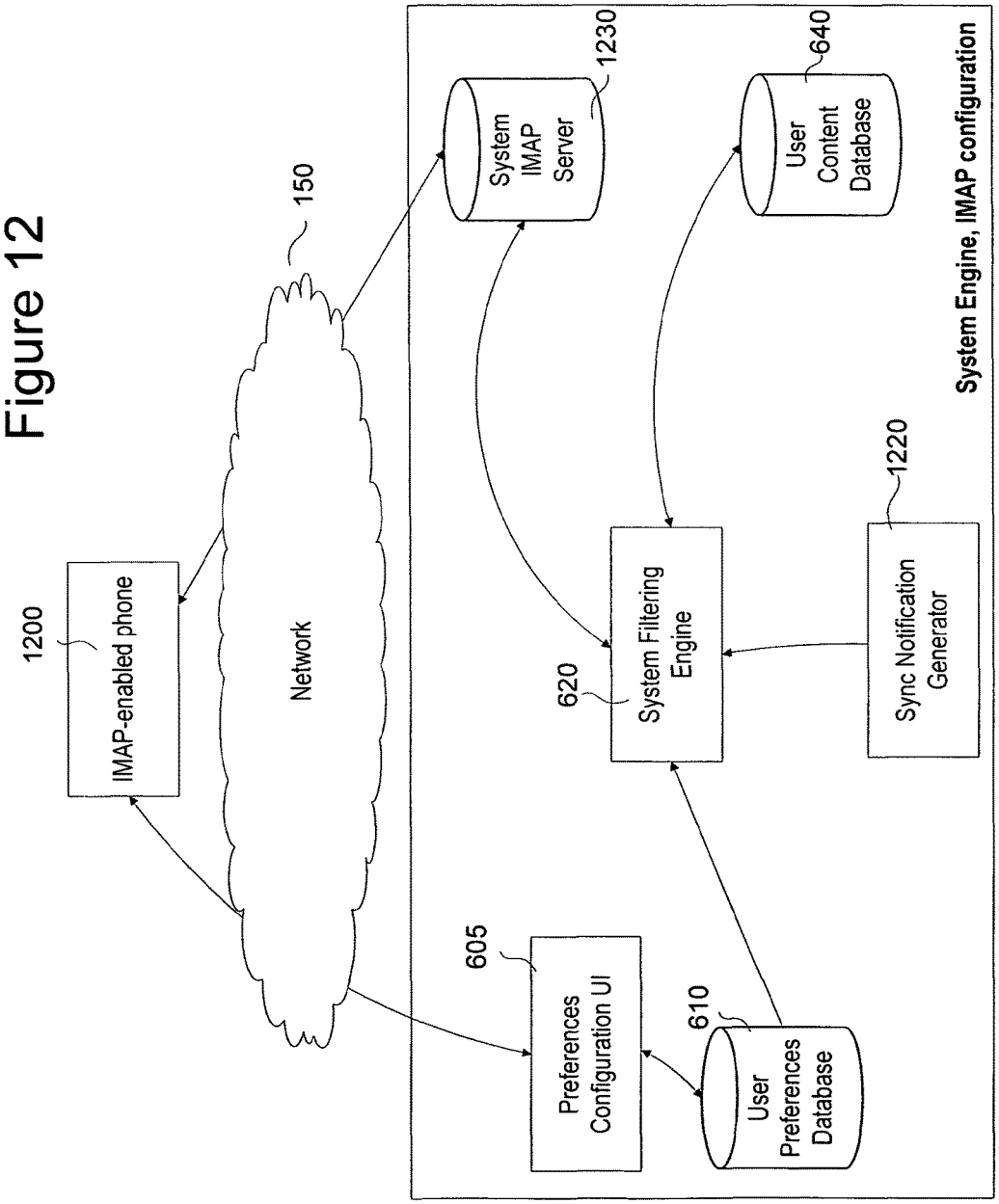
FIG. 12 is a block diagram illustrating yet another embodiment of a system in accordance with the present invention.

FIG. 12 shows an alternative configuration for implementing the system of the present invention using an IMAP server and IMAP enabled limited capacity processing device.

In the system of the present invention shown in FIG. 12, elements having common configuration with those set forth previous figures are noted with common reference numbers. In FIG. 12, a system engine includes a system IMAP server 1230, a user content database 1240, a notification generator 1220, all coupled to the filtering engine 620. The IMAP enabled phone will couple directly to an IMAP server 1230. As is understood by those skilled in the art, the IMAP server does not download messages to the IMAP enabled phone, but the IMAP enabled phone acts as a client to view the message stored on the IMAP server 1230. The filtering engine will communicate with the user content database in a manner described above. The relation of the elements shown in FIG. 12 is shown and described with respect to FIG. 13.

Figure 13:
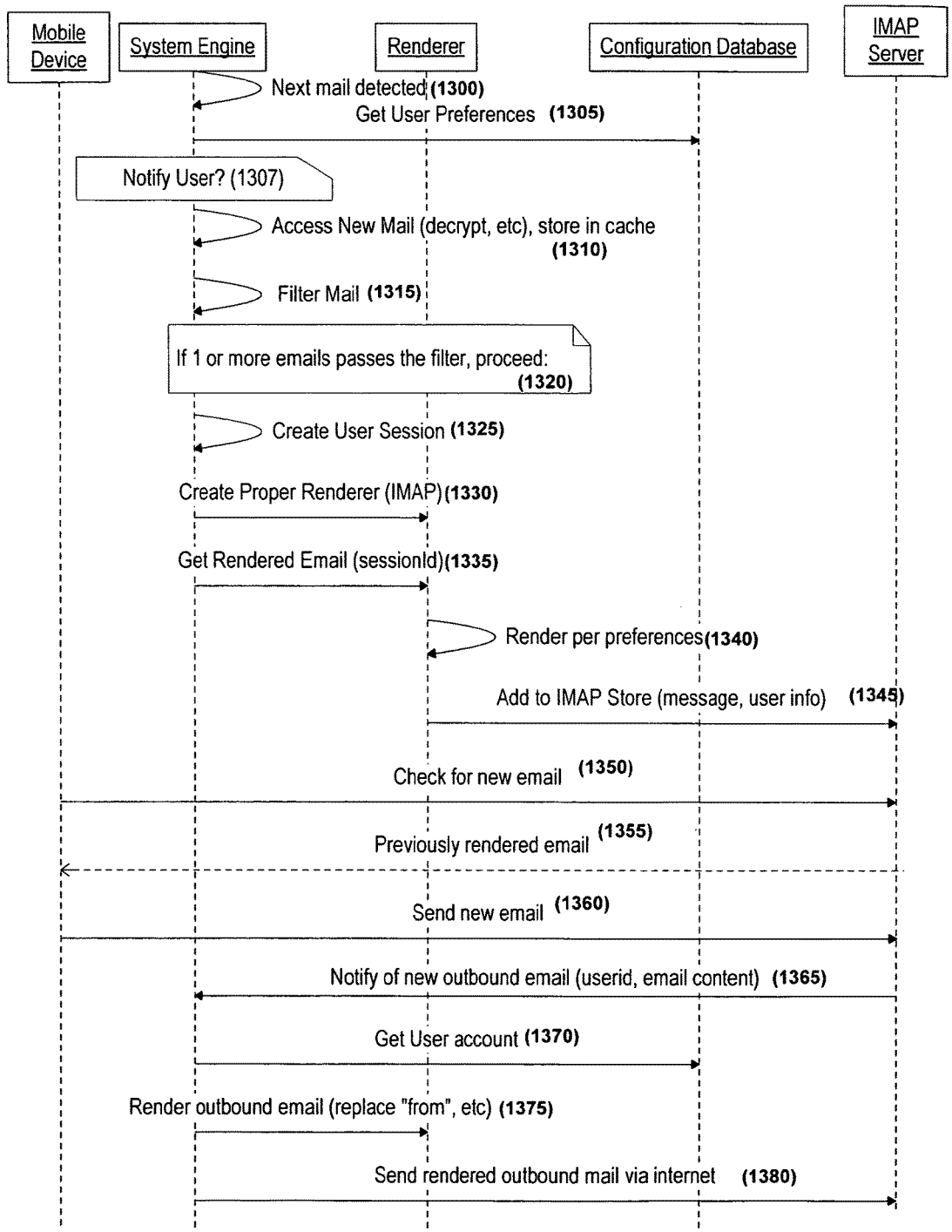
FIG. 13 is a sequence diagram illustrating the transactions occurring between the various elements in FIG. 6.

As shown in FIG. 13, when the system engine detects a new message for processing 1300, it will retrieve user preferences at step 1305 and at the configuration database 410. In this case, the sync system is not involved, so the new email will generally be any mail received in the IMAP server. Again, at step 1307, an initial determination of how often a user wishes to be notified of new mail is determined. If the method is enabled to pass mail upon receipt of this particular message, then at step 1310, the system engine will access the new message and decrypt as necessary, and filter the mail at step 1315 in accordance with the user preferences. If one or more messages passes the filter at step 1320, then a user session will be created at step 1325. A proper renderer, in this case an IMAP renderer, will be created at step 1330, and the rendered message will be provided at step 1335 to the renderer 1230. The message will then be added to the IMAP store 1230 at step 1345 on the IMAP server 630. When the mobile device 610 checks for new messages at step 1350, it will retrieve previously rendered messages at step 1355. As noted above, this may occur in whole, or in parts of the message. When new message is sent at step 1360, the IMAP server will notify that the system engine of new outbound message, including the user ID and message content at step 1365, the system engine 620 will retrieve the user's account information from a configuration database at step 1370, will render the outbound message at step 1375 and will send the rendered outbound message via the Internet at step 1380. It should be noted that in the previous configurations, the server has separate datastores for each user.

The present invention leverages a user's network connected limited processing device to provide meaningful access to the user's message.

Sending message whether by forwarding, replying, or creating is supported in a manner as to allow the point of connection of the sender to be preserved. In this case, the term "point of connection" refers to the user's relational identity to the communication medium. For example, email may be created and sent as though a user is using their work email connection, while they are in fact using their phone connection via the system of the present invention.

Point of connection preservation can be accomplished in a number of ways. The message application on the client device can simply store outbound message in its outbox and let the sync process utilized in U.S. Pat. No. 6,694,336 to sync that message to the outbox of the usual message sending device, such as the PC. The message will then be sent in the normal manner sent by that PC using its connection to the message transmission device. Alternatively, the message application may directly send the message. In this second alternative, account (identity) information is provisioned by providing all information necessary for the sending device to provide point of connection identity along with the messages. For example, this information may be provided directly in the device or sent in a link in a browser in the device. The message application can then correctly construct message header information before sending the message. One of average skill would readily understand how to substitute message origination information in standard protocols such as POP3 or IMAP. For example, IMAP configuration allows the From line in the message to be replaced with a user specified message account. This allows users having a limited processing device using a third-party message account to use their regular business messaging and appear as though originating from their business account. This rendered message is sent via the Internet using the IMAP server. Since the user is using an IMAP client device, the user will always be up to date with respect to the user's configuration in the user's default account. Yet another alternative is to configure the user's IMAP information to access an IMAP server operated by a substitute IMAP server. This intermediary server can provide the point of connection information configured by the user when sending messages, and retrieve messages from the user's main server at intervals configured by the user.

As noted above, links provided to the user in the message allow for a further feature of the system which involves advanced attachment handling. In one aspect, one of the links shown in FIG. 13 may include a "get attachment" link allowing the attachment to be provided to the user or sent to a facsimile machine, another PC, or even another message account. Attachments can be optionally synced to the device during message synchronization. When such a message is viewed on the device the user can manage the attachment as if it had been downloaded onto the device. Links provided on the user device control code on the system server or agent enabling the user to: request that the attachment be sent via message or fax to another person; forward the message with or without the attachment to another person; compose a new message and include the attachment from the original message; request the attachment be downloaded to the device; and retrieve information about the attachment such as type, size etc.

As noted above, one method of manipulating an attachment is to modify the message body to include a link to a URL. This URL can perform actions directly or point to a webpage that provides options for performing actions on the attachments. The advantage to this approach is that the message application on the device does not have to be modified. A second approach is to replace the original attachment with a special attachment. This proxy attachment is small and contains information about the original attachment. The system agent on the device includes code allowing it to understand what to do with this proxy attachment, including providing a menu of choices similar to the list above when the attachment is selected. The advantage to this approach is that the user interface on the client would clearly indicate the presence of an attachment and could readily display information about the attachment.

Attachments may also be sent with forwarded messages. In one embodiment, the Sync server can reconstruct the original message (with the attachment) and then modify it by adding the forwarded message address and body. This is performed be done prior to syncing it back to the source message application.

In a further aspect, applications on the device can request information from the system engine. This will be used to support the retrieval of attachments that were stripped during the sync. Additionally requests can be made to retrieve the next portion of a truncated body. The device agent 420, system engine 440, and the user's message application work together to maintain state information so that successive 'chunks' of the body can be retrieved. The message client will present this to the user and at its choosing either incorporate the chunks into the stored message or dispose of the chunks after the user has viewed them.

Yet another aspect of the system includes content streaming through device. A device agent 420 on the device will allow the user to request complete delivery of a message or attachment and stream it to a compatible device such as a laptop, printer, personal digital assistant or other device. Even content too large to be stored in the device could be streamed through the device to an external device. The device agent 420 will on user request ask the server to transfer specific raw unconverted content (such as a Microsoft Word document) in manageable pieces to the device. The device will in turn forward those pieces from the connection transport used to connect to the system (such as a wireless network) onto a locally connected device (via, for example, a local connection transport). Local connections may include bluetooth, IRDA, or cable attached devices. During the transfer the device agent 420 will not store the content. It will simply act as a connection agent for the content.

In a further aspect, the read/unread status of the message can be propagated to all devices in the personal information space. Using the IMAP, embodiment, the IMAP server maintains this status. Other types of mail servers will likewise track the read/unread status of a message and propagate it to other clients connected to such servers. In the embodiment of the invention using the system engine 440, the sync system of U.S. Pat. No. 6,694,336 can maintain this status across all platforms.

In additional embodiments of the present invention, further functionality is provided to a user. In one embodiment, the system incorporates a voice call box which provides the ability for the user to review email by having it read to the user over a telephone voice connection. Various implementations of this feature are provided.

A unique feature of the present invention is the ability for users to review mail using the collections. This allows the user to rapidly process unread items from collections, and focus on reading a fast response. This "zooming" process allows user to scroll through long messages with the phone's joystick or rocker and with a selection of a soft key designated for this process (for example, a "zoom" button), the user is moved to the next unread time in the collection until the collection is exhausted. This feature can be used whether reviewing messages using voice or text means.

An additional feature of the invention allows user to provide a response to an email using a voice clip, text or to listen to an email read by a text to speech message system. In addition, attachments can be listed at the bottom of an email body and when selected, the attachment may be rendered by converting the item to a bitmap on the network server and directing the phone browser to a URL to read the bitmap, the attachment may be forwarded via email, the bitmap may be sent to a fax or may be retrieved into the phone.

FIGS. 14-19 illustrate alternate embodiments which implement features of the present invention described herein. These features include a voice enabled delivery of messages, advanced email review by collection, accurate email status, and support for multiple types of devices.

Figure 14:
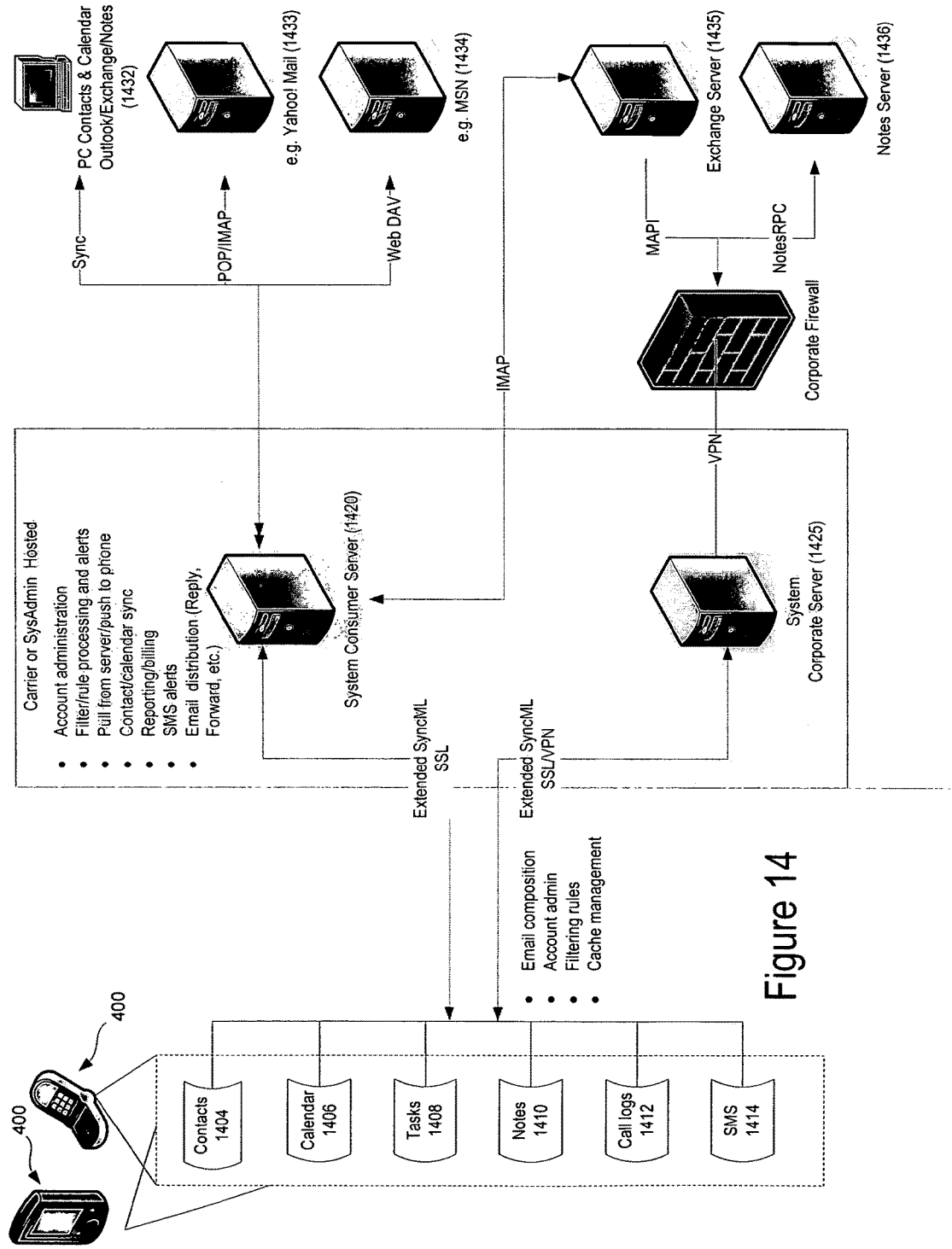
FIG. 14 is a block diagram of an alternative embodiment of the present invention.

FIG. 14 shows a series of client mobile devices 400 including, for example, mobile phones or personal data devices having operating systems such as Microsoft® CE, Microsoft® PocketPC, the Palm® OS, Symbian Series 60, Brew and Java®. Each phone my include data structures having contacts 1404, calendar 1406, tasks 1408, notes 1410, call logs 1412, SMS messages 1414 and the like stored in the device. Each device may further include a system agent 410 similar to that described above. In such devices, data from each of the structures in the device may be transported in other mechanisms. For example, a schedule request may include email addressing information, and an email may include a contact entry. Each phone my include a system agent provided by the System Administrator and functioning in accordance with the description herein, to access the data structures and provide a user interface to a user of the device. The agent provides assistance in email composition, account administration, cache management and filtering rules. The client communicates with a system server via an extended SyncML feature set using SSL, or a clear channel connection.

In this embodiment of the invention, the system is configured to deal with more than just messaging data. In this embodiment of the invention, there are two distinct types of data: new messages (email) addressed to the user (which may include appointment requests sent via email), and "interaction" events. Email is processed through the user's rules and, if qualified, is stored in the system email storage system shown in various embodiments in FIG. 4-7 or 14-16. The amount of data stored may vary by the configuration of the system (for example, the system may store the entire email including attachments, or store a subset of the email information. When storing a subset of information, the server requires a connection back to the source email server to retrieve non-stored information should the user request it.)

Interaction events are, for example, the entry of a contact into the user's PIM software or devices, an IM conversation, an Email sent by the user, a phone conversation, an appointment entry, an SMS sent by the user, or an allowed or blocked sender's list. In this embodiment, interaction events are analyzed to determine which people are involved in the event by using identifying information contained within the interaction event. Such information can include the meeting attendee email addresses, or the phone number from the call log, and the like.

The system may further include two types of servers—a system "consumer" server 1424 and a system "corporate" server 1425. Each server 1424, 1425 is hosted by a wireless telephone carrier, a private entity or by the System Administrator. The system servers provide account administration, filter and rule processing and alerts, push and pull functions to the device and from the server, contact and calendar sync, reporting and billing, SMS alerts and email distribution. In an embodiment wherein a corporate server is hosted by a carrier or System Administrator, the corporate server may communicate with secure email servers of a corporate entity using a virtual private network or other secure connection.

As shown in FIG. 14, the consumer system server may be designated to communicate with consumer level interfaces using, for example, the sync engines of U.S. Pat. No. 6,694,336 to access a personal information device such as a personal computer 1432, or a pop/imap client such as Yahoo® mail 1433 or a web client such as MSN 1434. The consumer server may communicate with the clients using the SyncML protocol, or an extended version of the SyncML protocol, via SSL.

The corporate server is designed to communicate with the device client 410 via an extended version of the SyncML protocol, and with an Exchange 1435 or Lotus Notes 1436 mail server via a connection secured by SSL or a VPN connection. It should be recognized that the designations "consumer" and "corporate" are for convenience only, and the basic functionality of each system server is equivalent. In each case, only the source of the data and the hosting location are changed.

In accordance with the system aspects described above, data enters the system via the agents 410 attached to the system server engine 400.

Figure 15:
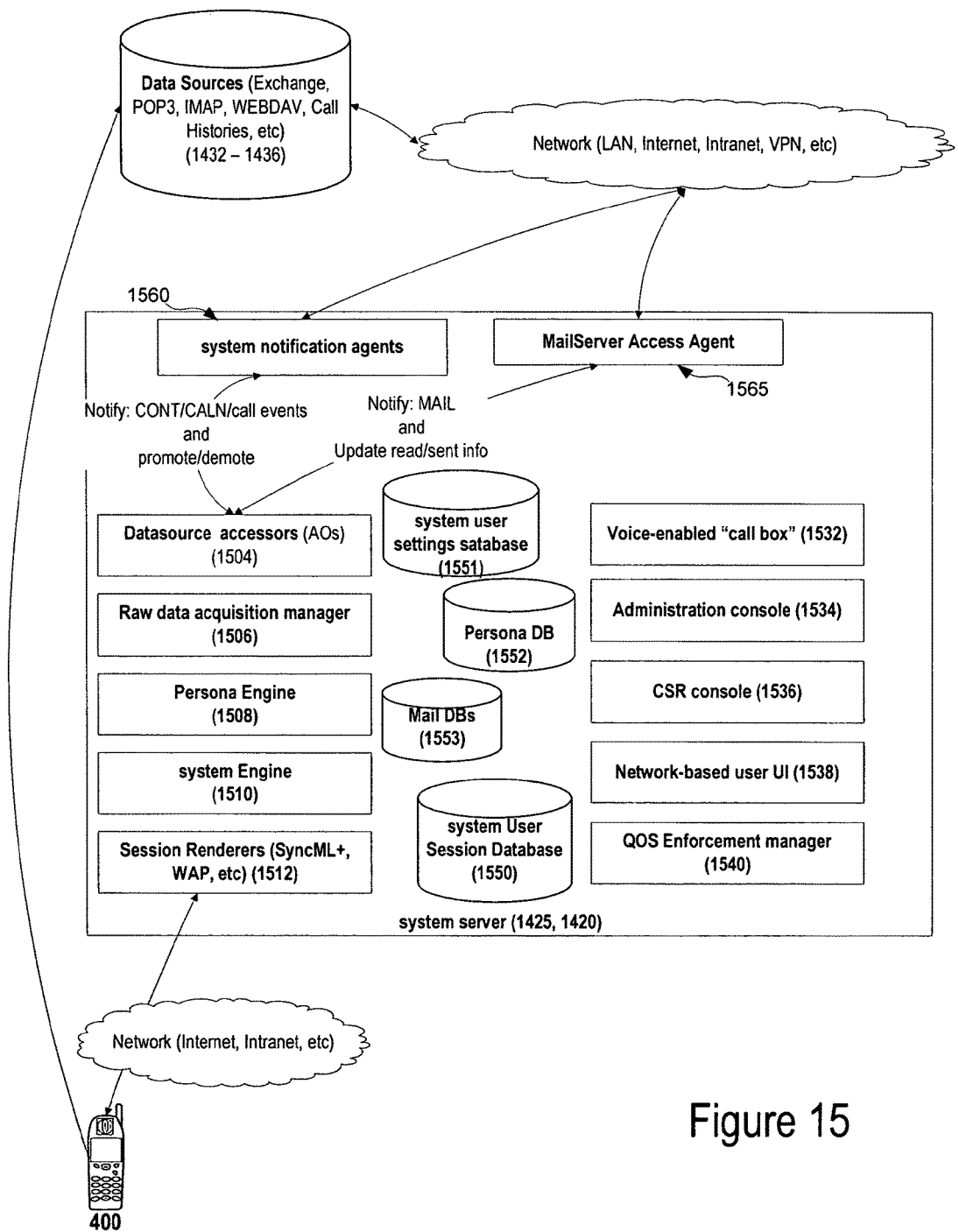
FIG. 15 is a block diagram of another alternative embodiment of the present invention.

FIG. 15 illustrates yet another embodiment of a system server 1420, 1425 in accordance with the embodiment of FIG. 14. To further enable the configuration based handling of messages and interaction events, a "persona" database 1552 is utilized to track characteristics of individuals whose characteristics are part of the personal information space of the user to allow the system of the present invention to intelligently characterize individuals into the aforementioned collections, and process communications and interactive events involving those individuals automatically. System user settings, rules and configuration may be stored in the settings database 1551, and user session information in the session database 1550. Also shown is a mail database 1553 which may comprise an "all mail database", a mobile mail database or a newly downloaded mail and mobile mail database, depending on the configuration of the persona database and how the system server is configured to handle incoming mail.

FIG. 15 shows the system server 1420/1425 coupled to the data sources (1432-1436) using system notification agents 1560 and a mail server access agent 1565. Events in the data sources 1432-1436 are passed to the system server 1420/1425 upon some triggering event (at regular intervals, on each event, upon a manual signal, etc.) for processing by the system server 1420/1425.

For each event, whether it be an interactive event or an email message, each person referenced in the event is looked up in the persona database. If the person exists, a record of the interaction event is added to the persona record (an example of which is shown in FIG. 9) in the database 1502. If the persona record doesn't yet exist, it is created with the identifying information retrieved from the interaction event. In one example, suppose a notification of an appointment for the user enters the system. The system then looks up the organizer and attendees of the meeting by whatever identifying information is available. In one case, it may be the individual's name and/or email address. A note of the meeting between the user and the organizer (and other attendees) is made in the persona database and the system understands that the user has, met with each of the involved parties. Later, if one of the attendees sends the user an email, the system is able to determine that the sender is known to the user, and as a result, the email may be deemed worthy for promoting to the user's mobile device, or categorization in the user's collection, depending on user rule configuration.

During initial installation and configuration, the system may retrieve all the past interaction available from each of the attached devices. For example, the system retrieves the call logs from the user's mobile phone, and details of sent email from the mail server. The system may retrieve other information from the data stores 1404-1414 or the data sources 1432-1436. When mated with the synchronization system in U.S. Pat. No. 6,694,336, the system engine may retrieve a wealth of information such as contact entries, preexisting calendar appointments, assigned tasks, and the like from that system's data packages.

Various elements of the server architecture are shown in FIG. 15. Datasource accessors 1504 provide standardized access to a datasource such as Microsoft Exchange, Lotus Notes, a sync system such as that described in U.S. Pat. No. 6,694,336, a WEBDAV server, and other data sources. In this regard, they are similar to the application objects described in U.S. Pat. No. 6,694,336.

The data source assessors (DSA) 1504 provide a standardized interface to data sources (such as an Exchange, POP3, or IMAP server, a mobile device, an IM client, or the sync system of U.S. Pat. No. 6,694,336 via extended XML). The DSAs provide a bidirectional interface capable of relaying commands from the system server to the data source 1432-1436 and notifications from the data sources 1432-1436 to the system server). There are three distinct data source interfaces: 1) an interaction notification interface 2) persona promotion control 3) mail data handling. A particular DSA may implement one or more of them, as appropriate for its data source.

The raw data acquisition manager 1506 is a module responsible for orchestrating the retrieval of data from the users' data sources. The persona engine 1508 is a system component responsible for parsing interaction notifications to create and maintain a database tracking user's interactions (sent email, appointments, etc) with the personas found in the users' personal information space. Records generated by the engine are stored in the persona database 1552, and take a format generally represented in FIG. 19. The system engine 1510 is a group of modules that, in conjunction with the database developed by the persona engine, implements the user's filtering rules to create the a user experience. The engine includes modules to provide status to and service requests from system clients 400.

The voice enabled call box 1532 is a system component responsible for interacting with the user via spoken text. This system provides functions such as, for example, listening to an email or responding to an email with a voice clip. Session renders 1512 are protocol-specific modules that attach clients to the server. A SyncML+ renderer, WAP and HTML renders may be enabled. The administrator console 1534 and communications service request (CSR) console 1534 are management facilities provided to monitor and administer the system. The network-based UI 1538 is a user interface which may be provided to allow an administrator or users manage the user's account and email preferences via a browser. The QOS enforcement manager 1540 is a module that balances load by staging account data updates and data source access.

The interaction notification interface occurs through, the system notification agents 1560 and mail access agents 1565. These agents provide notification of events to the system, which are consumed by the persona database 1551. Each data source, through its DSA's event notification interface, reports on the interactions occurring at that data source. Each of the interaction types the system understands is represented by a corresponding data type in the system which serves as the unit of abstraction for a particular interaction event. This layering allows a mapping between the proprietarily-formatted information contained in a particular data source and a universalized version of that data which is understandable by the system. One such universalized version of the data is described in U.S. Pat. No. 6,269,361, although other universalized formats may be used in accordance with the present invention.

In one alternative, mail database 1553 is a newly downloaded mail and mobile mail database. This database contains the objects downloaded retrieved from the data source accessors during the data acquisition manager's acquisition session. These objects have not been processed by the filtering system. Once the persona engine has examined them, qualifying email is moved to a mobile mail database.

In yet another alternative, as noted above, an "all mail database" and a mobile mail database are provided. In this embodiment, once an email is determined to be mobile per the user's rules by the persona engine, it is added to a mobile mail DB. The architecture is neutral as to the location and nature of this database and any "newly downloaded mail DB". In each case, the database may be separate databases, or may simply be a list of promotable mail IDs referencing records in a single physical database. The mail database manager includes a clean-up process which is responsible for cleaning up the user's storage as a result of mail items passing out of the "mobile" range, or downloaded data expiring (such as attachments whose timer has expired or who have been sent to the mobile device). In these cases, the mail database manager generates a "delete" operation for the content in question and queues it to the attached mobile device(s).

The system further includes an automated persona promotion control routine. The promotion control routine is responsible for communicating to the data source a request to promote or demote of a particular contact to or from the user's mobile devices, based on the user's pattern of interactions with his known personas. Typically this interface is implemented as an XML client talking to the sync servers XML gateway. In one embodiment, the final determination of the contact's status is determined by the sync server of U.S. Pat. No. 6,694,336; the system server simply relays requests as a result of its world-view. In an alternate embodiment, the system server directly controls the promotion and demotion of contacts.

The server also includes a mail content handling interface which is responsible for providing universalized access to and control of a particular mail store. Since certain email such as sent email is in fact an interaction record, there is some functional crossover between sent email notifications and mail handling in general. The DSA simply treats the "sent email" folder as a source of data for the event notification, separate from processing incoming mail. The responsibilities of this interface are varied, and include: retrieving mail headers within a certain range, retrieving mail fields and mail attachments, sending mail, updating the origin mail server with new state information (such as read flags, or a new entry in the Sent Items folder), and retrieving new state information from the origin mail server (such a read status).

Additionally, since meeting requests arrive as specially formatted email, DSAs that implement this interface also contain modules to parse the meeting requests into the appropriate universalized meeting request records. Likewise, the DSA's translation module can also translate universalized meeting request decisions into the proper response emails (or server calls), as appropriate.

Figure 16:
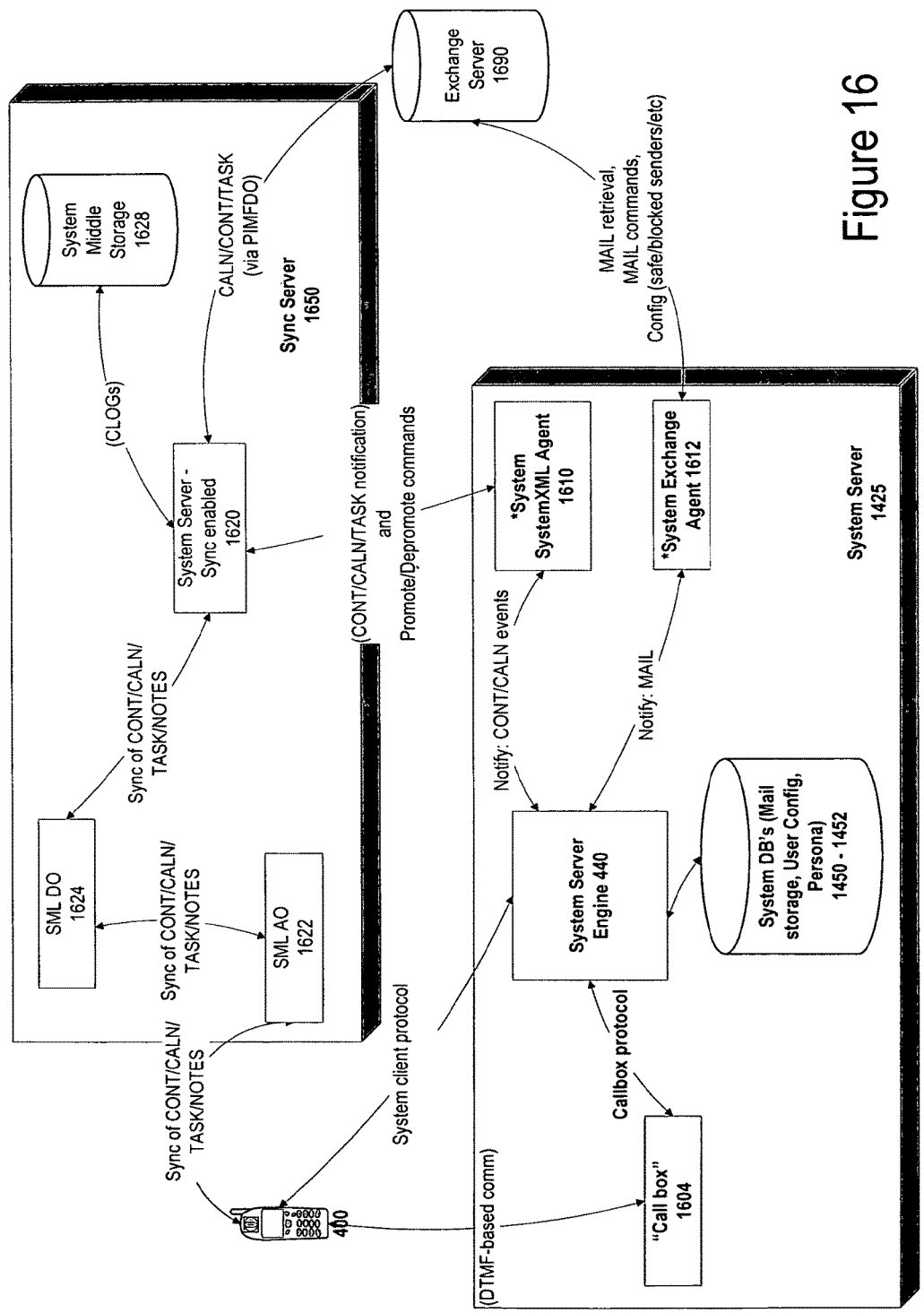
FIG. 16 is a block diagram of how one configuration of the system of the present invention integrates with a sync server described in U.S. Pat. No. 6,694,336.

Shown in FIG. 16 is the system server 1420/1425 of FIG. 15 incorporated with the synchronization system of U.S. Pat. No. 6,694,336 and a Microsoft® Exchange server. A Microsoft® Exchange server can be queried for the contents of the "sent Items" mail folder, or the user's blocked or allowed-senders lists. Additionally, the Microsoft® Exchange server may be called to enumerate the user's past appointments. This information will be submitted to the persona engine to build the list of known and contacted personas. As indicated above, the system server receives notifications from the data source, in this case the sync server 1650, regarding the user's interactions with other people (in the form of contact records, calendar appointments, assigned tasks, etc.).

FIG. 16 shows the system server engine 440 in communication with databases 1450-1452, a system exchange agent 1612 and a system XML agent 1610. Also provided is a call box 1604. The Sync server is shown in a simplified representation including a sync engine 1620, a system change log store 1629 and system data objects 1624 communicating with the devices 400 via an application object 1622. Events are transmitted to the system engine 440 via the exchange agent and the system XML agent.

When, for example, the server 1425 determines that a persona should be promoted, it communicates this via the systemXML interface 1610 to the sync server 1650. It is important to note that the system server 1425 and the sync server act synergistically to create the desired user experience. The sync server is well suited to syncing reasonably sized data (such as contacts, calendar events, notes, and tasks), whereas the system server is designed to handle the unique requirements of email storage and processing. The sync server maintains responsibility for the normal data synchronization requirements (including promoting/demoting contacts at the request of the system server, and syncing changes made on the phone and/or PIM).

Another source of interaction information is the XML agent 1610. The XML agent 1610 translates sync events received from a sync server 1650 via XML into notifications for the system of the present invention. Note that the XML agent may use SyncML to communicate with the elements of the system or may use modified versions of SyncML to incorporate any of the features noted herein. New contact entries, calendar events, or assigned tasks are detected and can be reflected in the persona database in the manner described above, but the data interface in this case may include the sync server 1650. Additionally, the user's contact folder hierarchy can be determined and presented to the user later, for example when they wish to save a message to a particular folder.

Figure 17:
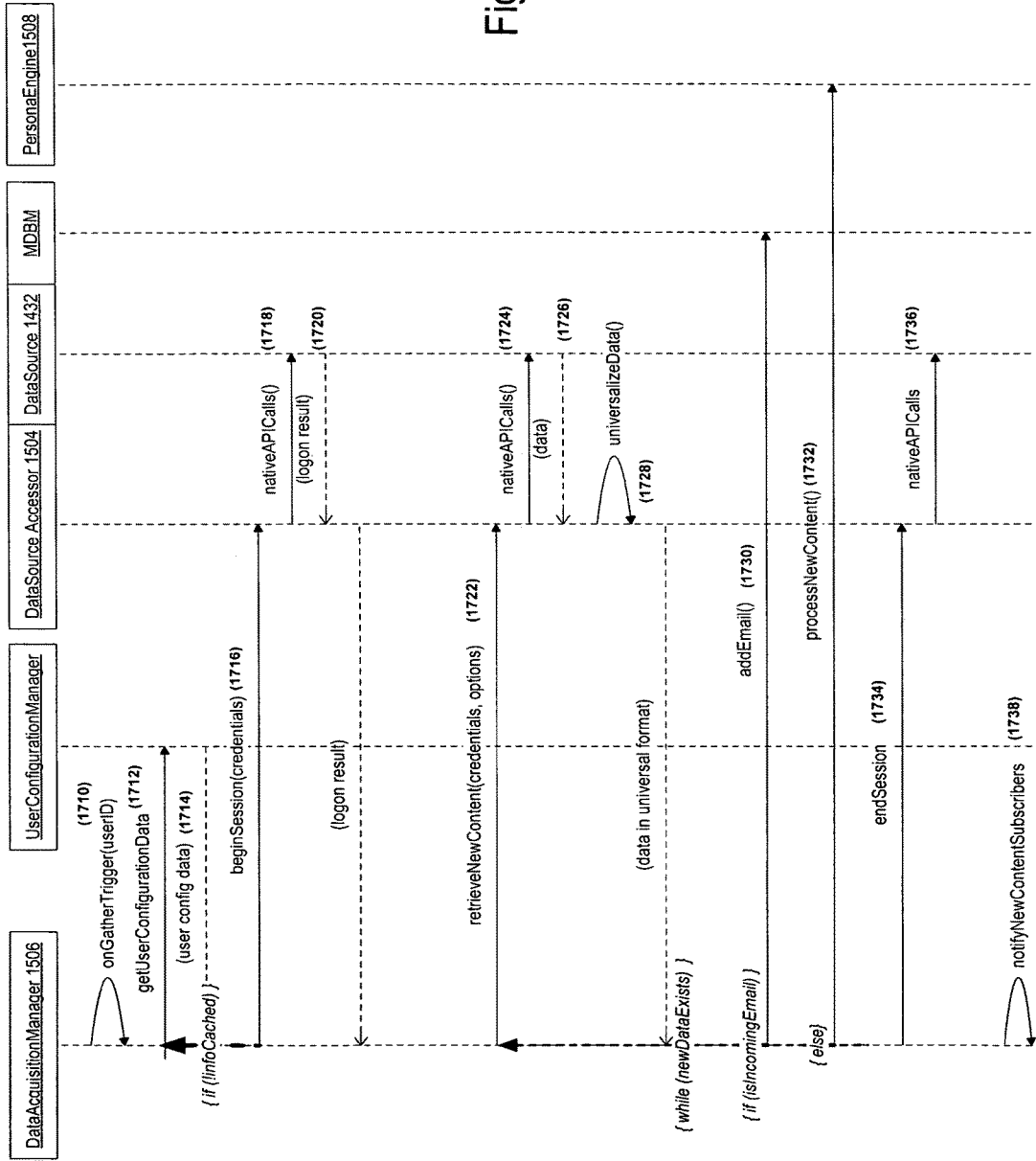
FIG. 17 is a sequence diagram of communication between a data acquisition manager and other components of the system.

FIG. 17 shows the data acquisition manager model in further detail, and the interactions with the user configuration manager, data source accessor and mail database manager.

The data acquisition manager is responsible for pulling new data into the system via the DSAs. The data acquisition manager, as a result of a trigger (such as a schedule or callback) (at step 1710), loads a user's account data (step 1712) and begins iterating through the configured DSAs (step 1728) to retrieve new interaction event data and new incoming email. The data acquisition manager first asks each DSA for any new interaction information, (step 1722) which the data acquisition manager transfers to the persona engine. Next, the data acquisition manager queries each DSA with a Mail handling interface and retrieves info (headers) regarding any new mail, which it passes to the mail database manager (step 1730). After retrieving all the new headers and logging out of the DSA, the data acquisition manager notifies the system that new mail has arrived to be scanned (step 1738). It is also possible to asynchronously submit interaction info to the reporting the info will notify the data acquisition manager via the data acquisition manager's standard listener.

A system promotion engine is provided to accomplish the filtering features of the present invention. The system promotion engine is responsible for answering promotion queries posed concerning particular emails and personas.

When the data acquisition manager has completed its new data scanning session and publishes its notification that new mail has arrived, a system promotion engine begins executing a scan of the new mail. The persona engine retrieves the user's configured promotion rules from the user account and passes the mail to a rule evaluation engine to determine if a message is promotable, and if so, which collections the message belongs in. Before adding the promotable mail to a live mail database, the persona engine retrieves the appropriate data for each message of each collection from the source data source accessor.

In one example, suppose ten (10) new messages arrive on the user's email server. The data acquisition manager, upon schedule or notification, wakes up and queries each data source accessor for new interaction information and then for new message headers. Once it has downloaded all the headers, the data acquisition manager adds them to the mail database manager and notifies the system that new mail has arrived. The persona engine iterates through the new mail and runs each message header through the configured rules.

Suppose five of the mails are classified to the "Normal" collection. The persona engine checks the user's prefetch rules for the "Normal" collection and sees that the user wants to prefetch the body content up to 5K. The persona engine, via the Exchange data source accessor, downloads the first 5K of each message and adds it to the mail record for the message it has created in a live mail database. Suppose one of the remaining items is a VIP email, and the user's options say to retrieve the attachments, up to 1 MB. Accordingly, the persona engine retrieves the attachment and adds it to the mail record for the message it has created in the live mail database. The remaining four messages qualify for the "Other/Bulk" collection. The user's rules say not to send any of these to the phone, so no fetching of their content is done and they are not added to the live mail database.

Contacts can be promoted and demoted automatically. Contact promotion scanning is done at an interval or in response to new interaction events. The user's settings may call for any sender or cc'd recipient of VIP mail to be automatically promoted, for example.

Another feature of the present invention is a mail database manager. The mail database manager is responsible for managing mail retrieval and server-side storage. The mail database manager receives email event objects pertaining to newly downloaded email from the data acquisition manager. These objects are stored in the mail database 1552. Later, the mail database manager can retrieve the message using the message id and source data source accessor information contained in the header object. In accordance with the present invention, mail may be stored temporarily in the system server in various configurations of databases.

In yet another unique aspect of the system of the present invention, no "current version" or "device latest version" information is maintained by this system. Due to the nature of email itself, the "mobile mail" list is in constant flux old, read, or deleted emails are removed and new emails arrive. There is no need to maintain a long list of historical change transactions; the system need only maintain a list of notifications to be sent to the client the next time the two are connected. Using an "assured delivery" queue model, the client and server can communicate asynchronously with guaranteed delivery of notifications. An alternative embodiment may maintain version information in a manner similar to that specified in U.S. Pat. No. 6,694,336.

A further unique aspect of the present invention is the ability to fetch uncached data for an email. In this embodiment, the mail database manager handles requests for missing data in an email. By utilizing the email id of the message in question, the mail database manager may retrieve the needed data from the origin data server. For example, the system may be configured to not download certain message attachments or bodies. When the user requests the download of a missing field, the request is relayed to the mail database manager will retrieve the requested info from the appropriate mail server. The mail database manager will queue the responses and provide notification of the fulfilled requests to the system engine via system engine notification mechanisms. The system engine's behavior is then determined by the user's configuration.

Figure 18:
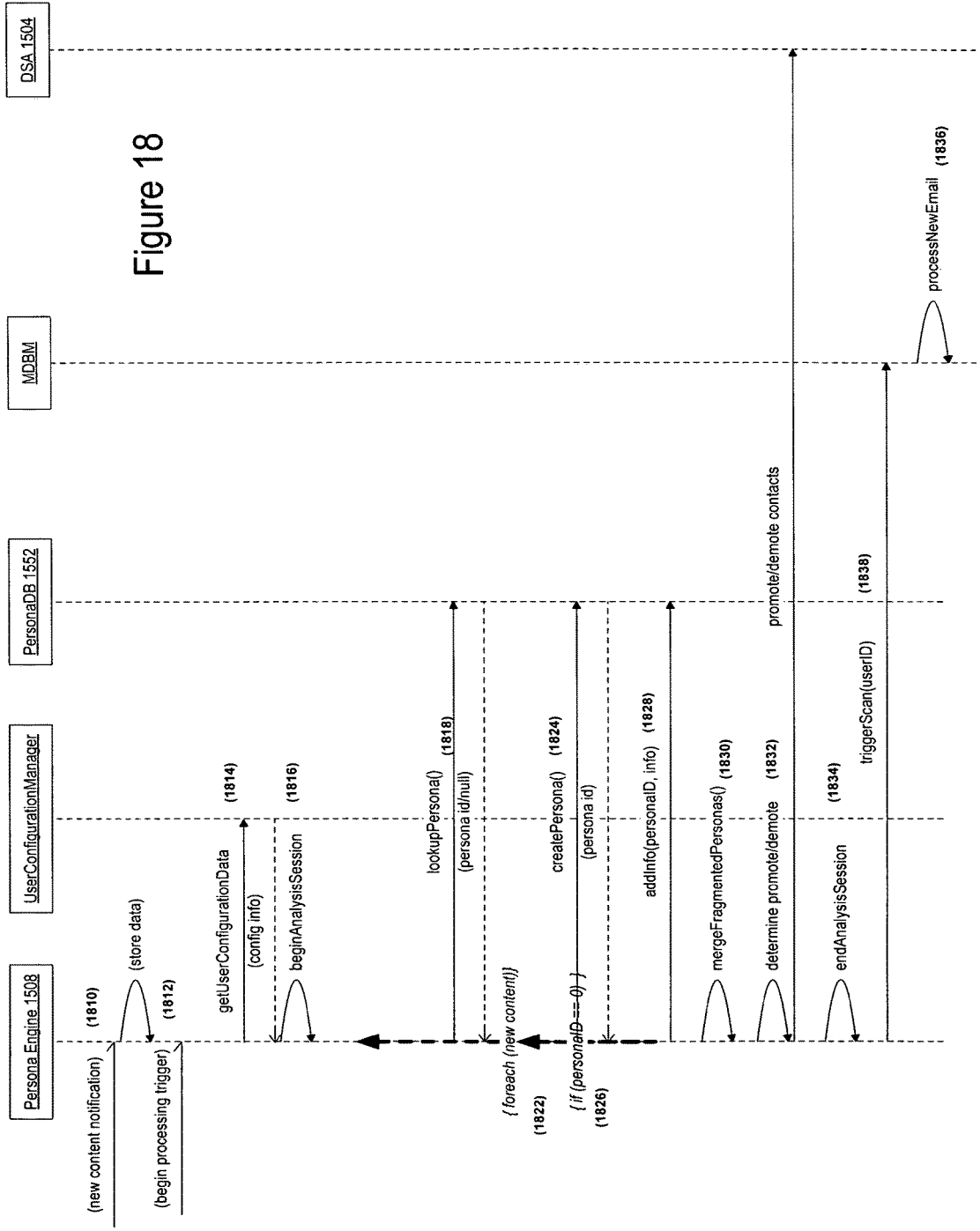
FIG. 18 is a sequence diagram illustrating communication between a persona engine and other components of the system.

In certain actions, reprocessing all email is required. Certain user actions may require the wholesale reprocessing of all the user's in-range mail headers. For example, adding a category or changing the blacklist require enumerating each message again with the new rules. This action can be performed by the mail database manager FIG. 18 illustrates another unique aspect of the present invention, the persona database manager (PDBM). The persona database is responsible for tracking the user's interaction with all of the electronic entities in the user's world. By consuming and aggregating the notification events from the suite of data source accessors, the PDBM can answer questions such as: 1) Does the user have a contact with this email/phone number in his address book? 2) Has the user contacted this person (email address/phone number/etc) before? 3) Is this person blacklisted? 4) Should this contact be promoted? Personas stored in the persona database contain the information detailed in FIG. 19.

As shown in FIG. 18, when an interaction notification arrives at the persona database, step 1810, the PDBM looks for a persona in the database that matches the data in the interaction notification (step 1818). The existing persona pertaining to the new data is determined by matching universally recognized key fields in the persona against the fields present in the notification. For example, the phone number recorded in a call log would be matched against the phone numbers attached to personas in the user's datastore. If a match is found, the interaction may be added to the persona's list of such interactions (step 1828). Alternatively, depending on the interaction type, a note that this particular persona is "known" or "contacted" can be made on the user's persona library list. This would in effect aggregate the collection of the interaction information, rather than keeping a record of it. In either model entries are removed from the "known list" if there are no new interaction events with a particular time frame (optionally determined by the user). If no match is found, a new persona identified by the supplied fields is created (step 1824).

It's possible to have a group of interactions that cannot be attributed to any existing persona (for example, you may not have a person's instant messenger "buddy" name in your contact record for them in your personal information contact manager). In that case, a persona containing the key fields reported by the datasource accessor (e.g., buddy name, or email address, names, and phone numbers in your PIN) is created. At some later time, if the system is able to match these two personas (if the user adds the buddy name to the contact record, for example), the personas are merged and the subordinate persona is deleted. Subsequent interactions will be attributed to the persona, since it now contains the new fields. In an alternative embodiment, a reference may be attached to the event to all personas, for example, to the sender and receiver. Still further, one may maintain a long list of such interactions, but select it on an interval, or simply maintain an aggregate of the information, rather than the information itself (e.g., 3 phone calls from persona X in the last <interval>).

As noted above, the system server may provide voice interaction features. The system server integrates with a VoiceXML driven telephony server in order to fulfill the natural language "voice features" of the system. There are two primary scenarios involving the callbox: 1) User selects "Listen to email" option on the system client; and 2) User selects "New voice clip" option on the system client (or chooses to forward an email plus a voice clip to someone). This option assumes the message ordering info described in the initialization has been completed. The system simply converts the target message into natural language over the voice channel. The user may respond with voice and/or listen to more emails. An alternative embodiment allows the user to record voice clips on their mobile device using the internal microphone and storage. The voice clip is then transmitted to the server for transmission with the email.

TAPI (Telephony Application Program Interface) is a standard program interface that lets you and your computer "talk" over telephones or video phones to people or phone-connected resources elsewhere in the world. TAPI capabilities of the phones may vary wildly. A number of alternative embodiments exist in order to implement the voice callbox component of the system server. Currently, most phones cannot support both a persistent data and voice connection. Hence, the system of the present invention must be able to function when a data connection with the client is dropped. In one embodiment, the client software initiates a new phone call. In one alternative, where both a voice and data connection may be maintained, the client software continue to execute during the call and the client maintain a data connection with the server while the voice connection is active. Alternatively the client continues to execute with only the voice connection. In a further embodiment, the client can generate DTMF tones to communicate with the callbox on the server. In a further embodiment, where supported by the client, the phone programmatically hang-up. If no data connection is available, DTMF can be used instead to relay the data to the server via the callbox. If no DTMF is available and no data connection is available, the required data can be sent to the server before the call is initiated. In certain embodiments, the client application regains control automatically; in others, the user must restart the application. Yet another embodiment solution involves the server calling the phone back to initiate the session.

When the user initiates a callbox session, the client communicates some details to the system server. This can be done via DTMF or a data connection. Aside from authentication, the info transmitted is related to the message in question and the messages that follow it in "zoom order." This allows the callbox to implement a voice driven "next message" feature that processes the same message the "next message" feature on the phone would. An example of the info which may be transmitted is: the current message id, the current collection id, the current collection sort order and the current message sort order. In one embodiment, the IDs of each of the messages remaining on the phone are send down to the phone in the order they are read. In one embodiment, a "main menu" is provided where users can choose to compose another or listen to email, etc. Regardless, details concerning what was done must be sent to the client so it may adjust its read/unread information.

In a further embodiment, users are provided with the opportunity to respond to emails using a voice message. This option sends an email containing a voice clip. This may be a new email or a forward or reply to an existing one. The client communicates, for example, authentication info, a "forward" command, the referenced message info, the recipient info, the user interacts with the server and completes the request. If the user listens to any email in the session, the post-session update discussed above applies.

Post processing of emails may occur after the user reviews using the voice box system of the present invention. Whenever a user listens to an email, the system must produce a read notification just as if the user had read the email on the client. That way, the user won't "reread" all the email he just listened to when he returns to using the System client. To accomplish this, the read message ids are queued and sent to the System client after the voice session is completed.

Further features of the system of the present invention provide advantages to the user of a mobile client device. Communication of data to mobile devices generally runs into two major problems: intermittent connectivity and low bandwidth. Intermittent connectivity problems arise because users travel outside of range, get on planes, the subway, etc. The system of the present invention can be adapted to use a protocol which provides for asynchronous transmission of information. Typical mobile device bandwidth is limited and latency is high. The protocol should avoid transmitting unnecessary information. Another desirable aspect is that the user be able to use the most of the system when off the network—send emails, mark messages or attachments for download, reply or forward mail, etc.

In order to counteract these problems, the system of the present invention caches requests for service and transmits them en-masse when a connection is available. While the connection is available, new notifications are downloaded, as are results from previous requests the server processed while the phone was offline. Some requests, such as operations involving the callbox and the realtime global search require synchronous connections.

Both server and client maintain a queue of requests to be sent to each other. A client's queue typically contains the results of things that the user did while not connected. This queue may contain, for example, a request for an attachment, a reply/forward or composition of email generated off network, a notification of message read, a notification of setting change, or a request for an email body. The server's queue may include two sets of events: responses to previous client requests and notifications generated by the system, such as: a notification of new mobile mail, a notification of new meeting requests, a notification of message read, or a notification of setting change.

The system engine employs both an SMS and standard network socket listener for each protocol renderer. The communication model is an asynchrounous "store and forward" approach to populating data and handling client requests. Ideally, given an always-on connection, the request/response will be very fast.

The behavior upon data connection initiation by the client is that the client connects and authenticates, the client sends any immediate requests (callbox, global search) and receives server response, the client sends any queued requests to the server, each with sequential requested, the client sends an "queue empty" event, the server acknowledges the highest requestID it received, the server sends each message in its queue, the server sends "queue empty" event, the client acknowledges the highest responseID it received and the client disconnects.

When the ID acknowledge is received by the transmitting party, it may dispose of its queue object as appropriate. Note that it is not required to send the queue acknowledge message only upon receipt of the "queue empty" event. In fact, it is desirable to periodically acknowledge the other side in case of loss of connectivity (to reduce the number of items resent by the other side upon restoration of connectivity). Using this acknowledge scheme, if the connection is dropped, any records sent but not acknowledged will remain in the outbound queue and the sender will resend them the next time it connects. This means that the receiver likely sometimes receive the same queue entry twice. Each receiver can handle this simply by remembering ID of the last queue entry it got from the sender. If it receives one it has already seen, it can ignore it (but it may still acknowledge it).

Objects in the queue may be reordered according to type. For example, synchronous responses, or persona or collection status and settings notifications, if any, may always be delivered before new mail notifications.

In as further unique aspect, synchronous requests are handled differently. Synchronous requests, when added to the queue, trigger a data connection if one does not exists. If no data connection is available, the enqueue request fails with the appropriate error. This results in the creation of a ClientSessionMasterThread if one does not already exist. The CSMT scans the unsent queue and sends any synchronous requests before sending the others. The server likewise sends any responses to sync requests before sending normal asynchronous responses. This allows the implementation of a "cancel download" message.

Client processes requiring services may add requests to the outbound queue at any time. Asynchronous events will simply be added (and may be reordered depending on priority) and a QueueMgrResponse indicating successful (or failed) queuing will be returned to the caller immediately. If a synchronous event is added to the queue, however, the response returned contains a requestToken object. The caller may use the static waitForCompletedRequest member to block until the response has been received.

In one aspect, service request queues are maintained on the various system server enhancements. When the client (such as agent 420) lacks information in its cache to complete a request, it queues the request for that info. Subsequent requests are likewise added to the queue. When a connection trigger (which is user-configurable) is reached, the queued requests are sent to the system server. The system server un-queues the requests and generates its responses. The system server communicates them either during the same communication session or at a later date, when its own communications trigger is tripped or the client reconnects. Once the client receives a response, it removes the source request entry from its pending queue. Once the system server has successfully replied to a client's request, the response is removed from the server's queue to deliver. At any time, the system server may queue additional notifications for the client, and the client may queue additional requests for the system server. When a connection is established, the queues are transmitted.

Aggressive pre-fetching of data from the system server may be used. When the server has new mobile email, it may, depending on the user's configuration, push the email notification (including body content, if appropriate) to the client via SMS. Or, the system server may simply queue the notifications for the client and deliver them when the client next connects. Further, the system server could SMS the client to notify it to "phone home." The common theme is that the behavior is flexible to support both an asynchrounous model (such as queuing up attachments to download while on an airplane) or a connected model. The server can acknowledge which devices have received which notifications via the latest email version info table. Each client device reports the latest email version it has received notification of during every request to the server in order to keep the server up to date.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of automatically changing the classification type of a message processed by a message management system comprising a personal information space of a user of a mobile device, the personal information space of the user comprising a schedule of meetings and a list of addressees to a scheduled meeting in the schedule of meetings, and a database of user preference rules, the message destined for the mobile device of the user, the classification type having associated with it a level of importance to the user and one or more user preference rules for classifying messages into the classification type, the method comprising the steps:
    a. parsing, by the message management system, one or more data fields within the message;
    b. determining an initial classification type of the message by applying a first rule in the database of user preference rules to one of the one or more data fields of the message; and
    c. automatically changing the initial classification type of the message to a second classification type having a higher importance level if the domain name of the sender address appears in a list of addressees to a scheduled meeting in the schedule of meetings by applying a second rule in the database of user preference rules to one of the one or more data fields of the message, wherein automatically changing the initial classification is in response to a triggering event relating to data in the personal information space of the user.

2. The method of claim 1, wherein the classification type is one of VIP email, Standard email, and Other email, wherein the level of importance of VIP email is higher than the level of importance of Standard email, and the level of importance of Standard email is higher than the level of importance of Other email.

3. The method of claim 1, wherein the classification type is a user-added classification type.

4. The method of claim 1, wherein a user preference rule classifies a message into a message classification type if one of the one or more data fields contains a keyword.

5. The method of claim 1, wherein a user preference rule classifies a message into a message classification type if the domain name of the address of the sender of the message appears in an address field of the message other than the sender address field of the message.

6. The method of claim 1, wherein a user preference rule classifies a message into a message classification type if the address of the sender appears in a contact address book of the user.

7. The method of claim 1, wherein automatically changing the classification type of the message comprises promoting the classification type of the message to a classification type having a higher level of importance than the level of importance of the initial classification type.

8. The method of claim 1, wherein automatically changing the classification type of the message comprises demoting the classification type of the message to a classification type having a lower level of importance than the level of importance of the initial classification type.

9. The method of claim 1, wherein triggering event is distinct and separate from the message.

10. The method of claim 9, wherein the triggering event is entry of a contact into an address book of the user.

11. The method of claim 9, wherein the triggering event is a meeting being scheduled with a list of addressees.

12. The method of claim 9, wherein the triggering event is one of sending an email message, receiving an email message, sending a text message, and receiving a text message.

13. The method of claim 1, wherein the first rule is a default user preference rule.

14. The method of claim 13, wherein the default user preference rule is classifying a message as Standard email.

15. The method of claim 13, wherein the default user preference rule is classifying a message as Other mail when the address of the sender is not found in the personal information space of the user.

16. The method of claim 1, wherein the personal information space of the user comprises a contact address book of the user.

17. The method of claim 1, wherein the personal information space of the user comprises one of a database of email of the user and a database of text messages of the user.

18. A method of automatically changing the classification type of a message processed by a message management system comprising a personal information space of a user of a mobile device and a database of user preference rules, the message destined for the mobile device of the user, the classification type having associated with it a level of importance to the user and one or more user preference rules for classifying messages into the classification type, the personal information space of the user comprising a schedule of meetings and a list of addressees to a scheduled meeting in the schedule of meetings, the method comprising the steps:
    a. parsing, by the message management system, one or more data fields within the message;
    b. determining an initial classification type of the message by applying a first rule in the database of user preference rules to one of the one or more data fields;
    c. automatically changing the initial classification type to a second classification type by applying a second rule in the database of user preference rules to one of the one or more data fields; and
    d. promoting the message classification to a classification type having a higher importance level, if the domain name of the sender address appears in the list of addressees to the scheduled meeting in the schedule of meetings.

* * * * *